United States Patent [19]

Ohno et al.

[11] Patent Number: 4,920,031
[45] Date of Patent: Apr. 24, 1990

[54] SILVER HALIDE PHOTOGRAPHIC LIGHT-SENSITIVE ELEMENTS CONTAINING WATER SOLUBLE DYESTUFFS

[75] Inventors: Shigeru Ohno; Yoshio Inagaki; Keiichi Adachi; Yasuhito Momoki, all of Minami-ashigara, Japan

[73] Assignee: Fuji Photo Film Co., Ltd., Kanagawa, Japan

[21] Appl. No.: 208,608

[22] Filed: Jun. 20, 1988

[30] Foreign Application Priority Data

Jun. 19, 1987 [JP] Japan .................. 62-153132

[51] Int. Cl.$^5$ .................................. G03C 1/84
[52] U.S. Cl. .................. 430/522; 430/576; 430/581; 546/119; 546/120
[58] Field of Search .............. 430/522, 576, 581; 546/119, 120

[56] References Cited

U.S. PATENT DOCUMENTS

| | | | |
|---|---|---|---|
| 3,746,539 | 7/1973 | Ohmatsu et al. | 430/522 |
| 4,102,688 | 7/1978 | Sugiyama et al. | 546/119 |
| 4,130,430 | 12/1978 | Sugiyama et al. | 430/522 |
| 4,187,225 | 2/1987 | Bader et al. | 430/522 |

Primary Examiner—Jack B. Brammer
Attorney, Agent, or Firm—Sughrue, Mion, Zinn, Macpeak & Seas

[57] ABSTRACT

There are provided by the invention silver halide photographic light-sensitive materials containing dyestuff(s) represented by the general formula (I):

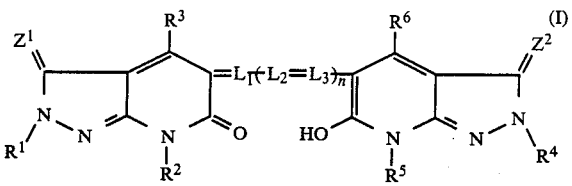

wherein $R^1$, $R^3$, $R^4$, $R^6$, $L_1$, $L_2$, $L_3$, $Z^1$ and $Z^2$ are groups conventional in this technical field, and $R^2$ and $R^5$ each represent an optionally substituted alkyl group, an optionally substituted aryl group, an optionally substituted heterocyclic group, $COR^7$ and $SO_2R^7$ (wherein $R^7$ represents an optionally substituted alkyl group or an optionally substituted aryl group) (including the case where the dyestuff(s) is(are) in the form of salt(s)).

The dyestuff(s) act(s) as a coloring agent for colored layer(s) for color filtering, antihalation, antiiradiation, etc.

Silver halide photographic light-sensitive materials containing dyestuffs represented by the general formula (I) of the invention have remarkable effects, for example, that stability of dyestuffs in the membrane with time lapse is high, relative sensitivity is high, lowering of sensitivity in exposure to light under high humidity is small, image quality is excellent, there is only a little remaining color, and/or there is only a little fog, as compared with silver halide photographic light-sensitive materials containing conventional dyestuffs for the aforementioned purposes.

13 Claims, No Drawings

SILVER HALIDE PHOTOGRAPHIC LIGHT-SENSITIVE ELEMENTS CONTAINING WATER SOLUBLE DYESTUFFS

BACKGROUND OF THE INVENTION

1. Field of the Invention

The present invention relates to silver halide photographic light-sensitive materials having a dyed hydrophilic colloidal layer, and more specifically to silver halide photographic light-sensitive materials having a hydrophilic colloidal layer containing dyestuff(s) which is(are) photochemically inert and at the same time readily decolored and/or dissolved therefrom in photographic process steps.

2. Description of the Prior Art

It is often carried out in silver halide photographic light-sensitive materials to color the photographic emulsion layer(s) or other layers for absorption of light in certain wavelength range.

When it is needed to control the spectral composition of light to be incident into the photographic emulsion layer, a coloring layer is provided on a side more distant from the support than the photographic emulsion layer in the photographic light-sensitive material. Such a coloring layer is called a filter layer. When there are plural photographic emulsion layers as in multi-layered color light-sensitive materials, the filter layer may sometimes be positioned between them.

In order to inhibit fading of images caused by that light scattered at passing through the photographic emulsion layer or after permeation of it is reflected on the interface of the emulsion layer and the support, or on the surface of the light-sensitive material on the opposite side of the emulsion layer, and enter the photographic emulsion layer, that is, in order to inhibit halation, it is often carried out to provide a coloring layer either between the photographic emulsion layer and the support or on the surface of the support at the opposite side from the photographic emulsion layer. Such a coloring layer is called an antihalation layer. In multi-layered color light-sensitive materials, antihalation layers are sometimes provided respectively among the layers.

Photographic emulsion layers are sometimes colored to inhibit lowering of image sharpness owing to scattering of light in the photographic emulsion layers (this phenomenon is generally called irradiation).

These layers to be colored are mostly comprising hydrophilic colloid, and thus water soluble dyestuffs are usually contained in the layers for their coloring. These dyestuffs are requested to satisfy the conditions as follows:

(1) they have appropriate spectral absorption in accordance with their use purpose (2) they are photochemically inert, that is, they do not have bad influence in chemical sense, e.g., lowering of sensitivity, latent image fading or fog on performance of the silver halide photographic emulsion layers (3) they do not leave harmful coloring on the photographic light-sensitive materials after the photographic process steps by decoloration or dissolution removal during the process steps.

Many efforts by ones skilled in the art have been made to find dyestuffs fulfilling these conditions, and the following dyestuffs are, for example, now known as the results. That is, they include oxonol dyestuffs having pyrazolone a nucleus or barbituric acid necleus as disclosed in U.K. Patent Nos. 506,385, 1,177,429, 1,311,884, 1,338,799, 1,385,371, 1,467,214, 1,433,102 and 1,553,516, Japanese Patent Unexamined Published Application (hereinafter referred to as J.P. KOKAI) Nos. 48-85130, 49-114420, 55-161233, and 59-111640, U.S. Pat. Nos. 3,247,127, 3,469,985 and 4,078,933, and the like; oxonol dyestuffs having a pyrazolopyridine nucleus as disclosed in Japanese Patent Publication for Opposition Purpose (hereinafter referred to as "J.P. KOKOKU") No. 58-35544; other oxonol dyestuffs disclosed in U.S. Pat. Nos. 2,533,472 and 3,379,533, U.K. Patent No. 1,278,621, and the like; azo dyestuffs disclosed in U.K. Patent Nos. 575,691, 680,631, 599,623, 786,907, 907,125 and 1,045,609, U.S. Pat. No. 4,255,326, J.P. KOKAI 59-211043, and the like; azomethine dyestuffs disclosed in J.P. KOKAI Nos. 50-100116 and 54-118247, U.K. Patent Nos. 2,014,598 and 750,031, and the like; anthraquinone dyestuffs disclosed in U.S. Pat. No. 2,865,752; arylidene dyestuffs disclosed in U.S. Pat. Nos. 2,538,009, 2,688,541 and 2,538,008, U.K. Patent Nos. 584,609 and 1,210,252, J.P. KOKAI Nos. 50-40625, 51-3623, 51-10927 and 54-118247, J.P. KOKOKU Nos. 48-3286, and 59-37303, and the like; styryl dyestuffs disclosed in J.P. KOKOKU Nos. 28-3082, 44-16594 and 59-28898 and the like; triarylmethane dyestuffs disclosed in U.K. Patent Nos. 446,583 and 1,335,422 and J.P. KOKAI No. 59-228250 and the like; merocyanine dyestuffs disclosed in U.S. Pat. Nos. 1,075,653, 1,153,341, 1,284,730, 1,475,228 and 1,542,807 and the like; cyanine dyestuffs disclosed in U.S. Pat. Nos. 2,843,486 and 3,294,539 and the like, and so on.

Among them, oxonol dyestuffs having two pyrazolone nuclei have a property that they are decolored in a developing solution containing a sulfite, and have been used for dyeing light-sensitive materials as useful dyestuffs having only a small bad effects on the photographic emulsions.

However, some of dyestuffs belonging to this category have drawbacks that even though they have only a small influence on the photographic emulsions themselves, they, on the spectrally sensitized emulsions, spectrally sensitize them in unnecessary region or cause lowering of sensitivity surmised to be due to desorption of the sensitizing dyes. Further, though this type of dyestuffs whose methine chain was made longer come to absorb light of long wavelength, such dyestuffs have a drawback that they are unstable in aqueous solutions or in photographic light-sensitive materials.

On the other hand, oxonol dyestuffs having two pyrazolopyridine nuclei have drawbacks that they have bad effects on photographic emulsions or cause sensitivity lowering of spectrally sensitized emulsions, though they may absorb light in long wavelength.

Further, in some of rapid development processes which have recently come to be carried out, some of water soluble dyestuffs for coloring purpose remain in the photographic light-sensitive materials after the processes. It is proposed in order to solve the problem to use a dyestuff having high reactivity with sulfite ion, but such a method has a drawback that the dyestuff is not fully stable in the photographic film and lowered in concentration with time lapse, and thus the desired photographic effects cannot be obtained.

SUMMARY OF THE INVENTION

The first object of the invention is to provided silver halide photographic light-sensitive materials whose hydrophilic colloidal layer(s) has(have) been dyed by novel water soluble dyestuff(s) which does(do) not have harmful influence on photographic characteristics of the silver halide emulsion layer(s).

The second object of the invention is to provide silver halide photographic light-sensitive materials whose hydrophilic colloidal layer(s) has(have) been dyed by novel water soluble dyestuff(s) which is(are) excellent in a property decolored by developing process.

The third object of the invention is to provide silver halide photographic light-sensitive materials containing novel water soluble dyestuff(s) where the dyed hydrophillic colloidal layer(s) is(are) stable with time lapse.

These object of the invention can be attained by a silver halide photographic light-sensitive material containing at least one of dyestuffs represented by the general formula (I):

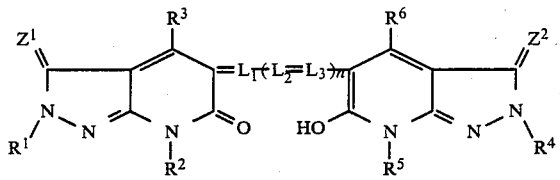

wherein $R^1$ and $R^4$ each represent an optionally substituted alkyl group, an optionally substituted aryl group or an optionally substituted heterocyclic group; $R^2$ and $R^5$ each represent an optionally substituted alkyl group, an optionally substituted aryl group, an optionally substituted heterocyclic group, $-COR^7$ or $-SO_2R^7$; $R^3$ and $R^6$ each represent a hydrogen atom, a cyano group, a hydroxyl group, a carboxylic acid group, an optionally substituted alkyl group, an optionally substituted aryl group, $-COOR^7$, $-OR^7$, $-NR^8R^9$, $-N(R^8)COR^9$, $-N(R^8)SO_2R^9$, $-CONR^8R^9$ or $-N(R^8)CONR^8R^9$ (wherein $R^7$ represents an optionally substituted alkyl group or an optionally substituted aryl group, and $R^8$ and $R^9$ each represent a hydrogen atom, an optionally substituted alkyl group or an optionally substituted aryl group); $Z^1$ represents an oxygen atom or $=NR^{10}$; $Z^2$ represents an oxygen atom or $=NR^{11}$ (wherein $R^{10}$ and $R^{11}$ represent nonmetal atomic groups necessary for forming a five-membered ring, which may has substitutent(s), with linkage to $R^1$ and $R^4$ respectively); $L_1$, $L_2$ and $L_3$ each represent an optionally substituted methine group or $L_1$, $L_2$ and $L_3$ as a whole represent an optionally substituted cyclic group where methine groups are linked together; and n represents 0, 1 or 2; provided that at least one of $R^1$, $R^2$, $R^3$, $R^4$, $R^5$, $R^6$, $L_1$, $L_2$ and $L_3$ represents a group having at least one carboxylic acid group or at least one sulfonic acid group.

Compounds of the general formula (I) of the invention are structurally different from usual oxonol dyestuffs having a pyrazolopyridine in that the groups represented by $R^2$ and $R^5$ are not hydrogen atoms, and it is surmised that this differential point gives the former compounds favorable characteristics that they do not have harmful influence on silver halide photographic light-sensitive materials and are excellent in stability with time lapse.

DETAILED DESCRIPTION OF THE INVENTION

Though compounds of the general formula (I) can exist as a tautomer mixture of the following general formulae (Ia) and (Ib) when $Z^1$ and $Z^2$ are, for example, oxygen atoms, all the compounds are represented by the structural formula of (I) for convenience sake in the present specification.

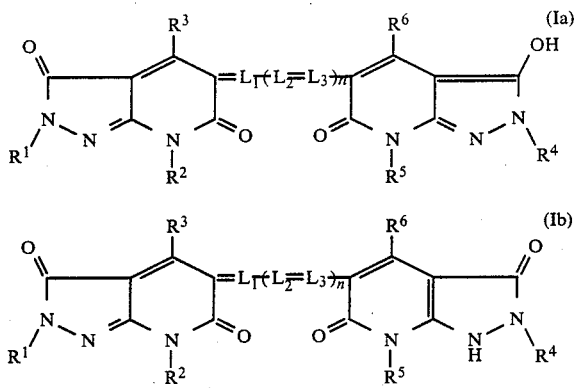

$R^1$, $R^2$, $R^3$, $R^4$, $R^5$, $R^6$, $R^7$, $R^8$, $R^9$, $R^{10}$, $R^{11}$, $Z^1$, $Z^2$, $L_1$, $L_2$ and $L_3$ in the general formula (I) are described in detail below.

The alkyl group represented by $R^1$, $R^2$, $R^3$, $R^4$, $R^5$, $R^6$, $R^7$, $R^8$ or $R^9$ can be any of straight-chain, branched and cyclic alkyl groups, preferably having 1 to 6 carbon atoms and can have substitutent(s) such as halogen atom(s) (e.g., F, Cl, Br, etc.), a hydroxyl group, a cyano group, a carboxylic acid group, a sulfonic acid group, an alkoxy group (e.g., a methoxy group, an isopropoxy group, etc.), an optionally substituted aryloxy group (e.g., a phenoxy group, a 4-sulfophenoxy group, etc.), an optionally substituted amino group (e.g., an amino, a dimethylamino group, an N-(3-sulfopropyl)-N-methylamino group, an acetylamino group, a methanesulfonylamino group, a methylcarbamoylamino group, a methylamino group, an anilino group, etc.), an aryl group (e.g., a phenyl group, a naphthyl group, etc.), or the like. Specific examples thereof are methyl, ethyl, n-propyl, isopropyl, t-butyl, 2-ethylhexyl, benzyl, cyclohexyl, 2-sulfoethyl, 3-sulfopropyl, 4-sulfobutyl, 6-sulfohexyl, 2-sulfovenzyl, 2,4-disulfobenzyl, 2-carboxyethyl, carboxymethyl, 4-carboxybenzyl, 2,4-di(3-sulfopropoxy)benzyl, 2-chloroethyl, trifluoromethyl, dimethylaminoethyl, 2-[N-methyl-N-(4-sulfobutyl)amino]ethyl, 2-methanesulfonylaminoethyl, 2-acetylaminoethyl, 2-piperazinoethyl 2-hydroxyethyl, etc. groups.

Aryl groups represented by $R^1$, $R^2$, $R^3$, $R^4$, $R^5$, $R^6$, $R^7$, $R^8$ and $R^9$ include phenyl groups, naphthyl groups or the like. These groups may have substituent(s) such as halogen atom(s) (e.g., F, Cl, Br, etc.), alkyl group(s), (e.g., methyl group(s), ethyl group(s), etc.), hydroxyl group(s), carboxylic acid group(s), sulfonic acid group(s), cyano group(s), optionally substituted alkoxy group(s) (e.g., methoxy group(s), ethoxy group(s), 2-hydroxyethoxy group(s), 4-sulfobutoxy group(s), 3-carboxypropoxy group(s), n-butoxy group(s), etc.), optionally substituted amino group(s) (e.g., amino group(s), dimethylamino group(s), diethylamino group(s), acetylamino group(s), methanesulfonylamino group(s), N-methyl-N-(4-sulfobutyl)amino group(s), etc.), optionally substituted carbamoyl group(s), (e.g., methylcarbamoyl group(s), 3-sulfopropylcarbamoyl group(s), etc.), optionally substituted sulfamoyl group(s) (e.g., methylsulfamoyl group(s)), or the like. Specific examples thereof are 4-sulfophenyl, 2,5-disulfophenyl, 2-methyl-4-sulfophenyl, 3-sulfophenyl, 3,5-disulfophenyl, 4-carboxyphenyl, 5,7-disulfo-3-naphthyl, 4-dimethylaminophenyl, 4-{N-ethyl-N-(2-sulfoethyl)amino}phenyl, 3-acetylaminophenyl, 3-(2-sulfoethylcarbamoyl)phenyl, 4-hydroxyphenyl, 3-methoxyphenyl, p-tolyl, 4-cyanophenyl, 2,4-di(4-sulfobutoxy)phenyl, 4-chlorophenyl, 2-chloro-4-methylphenyl, 3,5-dicarboxyphenyl, etc. groups.

Heterocyclic groups represented by $R^1$, $R^2$, $R^4$ and $R^5$ each represent a 5- or 6-membered nitrogen-containing heterocyclic group (containing a condensed ring), and may each have substituent(s) such as carboxylic acid group(s), sulfonic acid group(s), hydroxyl group(s), halogen atom(s) (e.g., F, Cl, Br, etc.), optionally substituted alkyl group(s) (e.g., methyl group(s), ethyl group(s), etc.), or the like. There can be mentioned as the 5- or 6-membered nitrogen-containing heterocycles (containing condensed rings) pyridine, pyrimidine, benzothiazole, benzoxazole. Specific examples thereof are 5-sulfopyridin-2-yl, 5-carboxypyridin-2-yl, 5-sulfopyridine-2-yl, 5-carboxypyrimidin-2-yl, 5-sulfobenzothiazol-2-yl, 2-pyridyl, 2-benzoxazolyl, 6-carboxymethylpyridin-2-yl, etc. groups.

When $Z^1$ represents $=NR^{10}$ or $Z^2$ represents $=NR^{11}$, the 5-membered ring formed by linkage of $R^{10}$ and $R^1$, or $R^{11}$ and $R^4$ includes, for example, an imidazole ring, a benzimidazole ring, a triazole ring, etc., and they can each have substituent(s) such as carboxylic acid group(s), sulfonic acid group(s), hydroxyl group(s), halogen atom(s) (e.g., F, Cl, Br, etc.), alkyl group(s) (e.g., methyl group(s), ethyl group(s), etc.), optionally substituted alkoxy group(s) (e.g., methoxy group(s), 4-sulfobutoxy group(s), etc.), or the like.

The acyl groups represented by $R^2$ and $R^5$ are preferably lower alkylcarbonyl groups such as acetyl groups or propionyl groups.

Methine groups represented by $L_1$, $L_2$ and $L_3$ can each have a substituent such as an optionally substituted alkyl group (e.g., a methyl group, an ethyl group, a benzyl group, a 2-sulfoethyl group, a 2-hydroxyethyl group, etc.), an aryl group (e.g., a phenyl group, a p-tolyl group, etc.), a carboxylic acid group, a sulfonic acid group, a cyano group, an optionally substituted amino group (e.g., a dimethylamino group, etc.), a halogen atom (i.e., F, Cl, Br, I), or the like. Alternatively, optionally substituted methine groups of these $L_1$, $L_2$ and $L_3$ can combine to form a ring such as

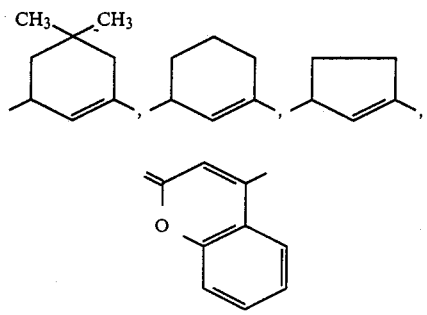

Preferred compounds among those of the general formula (I) are those where $R^1$ and $R^4$ each represent an alkyl group or aryl group each having at least one carboxylic acid group or sulfonic acid group. More preferred compounds among them are compounds of the general formula (I) wherein $Z^1$ and $Z^2$ represent oxygen atoms, and $R^1$ and $R^4$ each represent an alkyl group or an aryl group each having at least one carboxylic acid group or sulfonic acid group.

The carboxylic acid group and sulfonic acid group can each be a free acid or a salt (either a salt with an inorganic acid such as a Na, K or $NH_4$ salt, or a salt with an organic base such as a triethylammonium salt).

Specific examples of dyestuffs used in the present invention are exhibited below, but the invention should not be limited thereto.

| Compound | $R^1$, $R^4$ | $R^2$, $R^5$ | $R^3$, $R^6$ | $=L_1(-L_2=L_3)_{\overline{n}}$ | $Z^1$, $Z^2$ |
|---|---|---|---|---|---|
| 1 | —⟨phenyl⟩—SO₃K | —CH₃ | —CH₃ | =CH— | O |
| 2 | —CH₂—⟨phenyl-SO₃K⟩ | ⟨phenyl⟩ | —COOK | =CH— | O |
| 3 | —⟨phenyl⟩—SO₃Na | ⟨phenyl⟩ | —OC₂H₅ | =CH— | O |
| 4 | —CH₂CH₂SO₃H | —CH₂CH₂OH | ⟨phenyl⟩ | =CH— | O |
| 5 | —(CH₂)₃SO₃K | —COCH₃ | —NHCOCH₃ | =CH— | O |
| 6 | —⟨phenyl⟩—SO₃K | —CH₃ | —COOC₂H₅ | =CH— | O |

-continued

| Compound | R¹, R⁴ | R², R⁵ | R³, R⁶ | $=L_1(-L_2=L_3)_{\overline{n}}$ | Z¹, Z² |
|---|---|---|---|---|---|
| 7 | —C₆H₄—SO₃K | —CH₃ | —CH₃ | =CH—CH=CH— | O |
| 8 | —C₆H₄—SO₃K | —C₆H₅ | —COOK | =CH—CH=CH— | O |
| 9 | —C₆H₄—SO₃K | —CH₃ | —CH₃ | =C(CH₃)—CH=CH— | O |
| 10 | —CH₂CH₂COOH | —CH₂CH₂OH | —COOH | =CH—CH=CH— | O |
| 11 | —CH₂CH₂SO₃K | —C₆H₅ | —CH₃ | =CH—C(CH₃)=CH— | O |
| 12 | —C₆H₄—SO₃Na | —C₆H₄—SO₃Na | —CH₃ | =CH—CH=CH— | O |
| 13 | —C₆H₃(SO₃Na)₂ (2,5-disulfo) | —CH₃ | —COONa | =CH—CH=CH— | O |
| 14 | —C₆H₄—SO₃K | —CH₃ | —COOK | =CH—CH=CH— | O |
| 15 | —CH₂—C₆H₄—SO₃Na (o-) | —(CH₂)₂SO₃Na | —COONa | =CH—CH=CH— | O |
| 16 | —CH₂CH₂SO₃K | —COCH₃ | —COOK | =CH—CH=CH— | O |
| 17 | —CH₂—C₆H₄—SO₃K (o-) | —C₆H₅ | —CH₃ | =CH—CH=CH— | O |
| 18 | 2-pyridyl-4-SO₃K | —C₆H₅ | —CH₃ | =CH—CH=CH— | O |
| 19 | —C₆H₄—SO₃Na | —CH₂CH₂OH | —COONa | =CH—CH=CH— | O |

-continued

| Compound | $R^1, R^4$ | $R^2, R^5$ | $R^3, R^6$ | $=L_1(-L_2=L_3)_{\overline{n}}$ | $Z^1, Z^2$ |
|---|---|---|---|---|---|
| 20 | 4-(SO₃K)-phenyl | —CH₃ | —CONHCH₂CH₂OH | =CH—CH=CH— | O |
| 21 | —(CH₂)₃SO₃K | —CH₂CH₂COOK | phenyl | =CH—CH=CH— | O |
| 22 | —CH₂-(2-SO₃K-phenyl) | —CH₃ | —COOK | =CH—CH=CH— | O |
| 23 | —CH₂CH₂SO₃K | —CH₃ | —COOK | =CH—CH=CH— | O |
| 24 | 7-methyl-1,3-bis(SO₃Na)-naphthyl | —CH₃ | —COONa | =CH—CH=CH— | O |
| 25 | 3-(SO₃K)-phenyl | —C₂H₅ | —COOC₂H₅ | =CH—CH=CH— | O |
| 26 | 2-methyl-1,4-bis(SO₃K)-phenyl | —CH₃ | —OC₂H₅ | =CH—CH=CH— | O |
| 27 | 4-(SO₃Na)-phenyl | —CH₃ | —CN | =CH—CH=CH— | O |
| 28 | —CH₂-(3-methyl-4-SO₃K-phenyl) | phenyl | —CF₃ | =CH—CH=CH— | O |
| 29 | 3-Cl-4-SO₃Na-phenyl | —CH₂SO₃Na | —COONa | =CH—CH=CH— | O |
| 30 | —CH₂-(2,5-bis(SO₃Na))-phenyl | —CH₃ | —ᵗC₄H₅ | =CH—CH=CH— | O |
| 31 | —(CH₂)₄SO₃K | —CH₃ | —COOK | =CH(CH=CH)₂ | O |

-continued

| Compound | R¹, R⁴ | R², R⁵ | R³, R⁶ | $=L_1\!-\!(L_2=L_3)_{\overline{n}}$ | Z¹, Z² |
|---|---|---|---|---|---|
| 32 | 4-SO₃Na-C₆H₄- | 3-SO₃Na-C₆H₄- | —COONa | $=CH(CH=CH)_{\overline{2}}$ | O |
| 33 | 4-SO₃K-C₆H₄- | —C₆H₅ | —CH₃ | $=CH(CH=CH)_{\overline{2}}$ | O |
| 34 | —(CH₂)₄SO₃Na | —(CH₂)₄SO₃Na | —COOK | $=CH-(CH=CH)_{\overline{2}}$ | O |
| 35 | —(CH₂)₄SO₃Na | —CH₂CH₂OH | —COONa | $=CH-CH=\underset{\underset{\text{CH}_3}{\vert}}{C}-CH=CH-$ | O |
| 36 | —(CH₂)₄SO₃K | —CH₃ | —COOK | $=CH-CH=CH-$ | O |
| 37 | 3-SO₃K-C₆H₄- | 4-OCH₃-C₆H₄- | —H | $=CH-CH=CH-$ | O |
| 38 | —CH₂-(2-SO₃K-C₆H₄) | 3-SO₃K-C₆H₄- | —COOK | $=CH(CH=CH)_{\overline{2}}$ | O |
| 39 | 4-SO₃K-C₆H₄- | —CH₃ | —COOK | $=CH(CH=CH)_{\overline{2}}$ | O |
| 40 | —(CH₂)₃SO₃K | —CH₃ | —COOC₂H₅ | $=CH(CH=CH)_{\overline{2}}$ | O |
| 41 | 4-SO₃K-C₆H₄- | —C₆H₅ | NHCONHCH₃ | $=CH=$ | O |
| 42 | 4-SO₃K-C₆H₄- | —CH₃ | —NHSO₂CH₃ | $=CH-CH=CH-$ | O |
| 43 | —CH₂-(2-O(CH₂)₃SO₃K-C₆H₄) | —SO₂CH₃ | —NH-C₆H₅ | $=CH-$ | O |
| 44 | 4-SO₃Na-C₆H₄- | —CH₃ | —CH₃ | $=CH(CH=CH)_{\overline{2}}$ | O |
| 45 | —CH₂-(4-SO₃Na-C₆H₄) | 4-SO₃Na-C₆H₄- | —CH₃ | $=CH-(CH=CH)_{\overline{2}}$ | O |

-continued

| Compound | $R^1, R^4$ | $R^2, R^5$ | $R^3, R^6$ | $=L_1(-L_2=L_3)_{\overline{n}}$ | $Z^1, Z^2$ |
|---|---|---|---|---|---|
| 46 | 4-$SO_3K$-phenyl | phenyl | $-CH_3$ | $=CH-CH=CH-$ | O |

47: [structure]

48: [structure]

49: [structure]

50: [structure]

51: [structure]

52: [structure]

-continued

| Compound | $R^1, R^4$ | $R^2, R^5$ | $R^3, R^6$ | $=L_1(-L_2=L_3)_{\overline{n}}$ | $Z^1, Z^2$ |
|---|---|---|---|---|---|
| 53 | (see structure) | | | | |
| 54 | (see structure) | | | | |
| 55 | 4-($SO_3K$)phenyl- | $-CH_2CH_2OH$ | $-CH_3$ | $=CH-CH=CH-$ | O |
| 56 | 4-($SO_3K$)phenyl- | $-CH_2CH_2OH$ | $-COOC_2H_5$ | $=CH-CH=CH-$ | O |
| 57 | $-CH_2$-(2-$SO_3K$)phenyl | $-CH_2CH_2OH$ | $-CH_3$ | $=CH-CH=CH-$ | O |
| 58 | 4-($SO_3K$)phenyl- | $-(CH_2)_4SO_3K$ | $-CH_3$ | $=CH-CH=CH-$ | O |
| 59 | $-(CH_2)_4SO_3K$ | $-CH_2CH_2OH$ | $-CH_3$ | $=CH-CH=CH-$ | O |
| 60 | 4-($SO_3K$)phenyl- | $-(CH_2)_2SO_3K$ | $-CH_3$ | $=CH-CH=CH-$ | O |
| 61 | $-(CH_2)_2SO_3K$ | $-CH_2CH_2OH$ | $-CH_3$ | $=CH-CH=CH-$ | O |
| 62 | 2,5-di($SO_3Na$)phenyl- | $-CH_2CH_2OH$ | $-CH_3$ | $=CH-CH=CH-$ | O |
| 63 | 4-($SO_3K$)phenyl- | $-CH_2CH_2COOK$ | $-CH_3$ | $=CH-CH=CH-$ | O |
| 64 | $-(CH_2)_3SO_3K$ | $-CH_2CH_2OH$ | $-CH_3$ | $=CH-CH=CH-$ | O |

-continued

| Compound | R¹, R⁴ | R², R⁵ | R³, R⁶ | $=L_1+L_2=L_3\}_{\overline{n}}$ | Z¹, Z² |
|---|---|---|---|---|---|
| 65 | ![benzene-SO3K] | —CH₂COOK | —CH₃ | =CH—CH=CH— | O |
| 66 | ![benzene-SO3K] | —COCH₃ | —COOK | =CH—CH=CH— | O |
| 67 | ![benzene-SO3Na] | —CH₂CH₂OH | ![benzene-SO3Na] | =CH—CH=CH— | O |

A compound of the invention represented by the general formula (I) can be synthesized by reacting a dioxopyrazolopyridine compound represented by the following general formula (II) with a proper methine source, triemethine source or pentamethine source compound (for example, ethyl orthoformate, 1,5-diphenyl-1,5-diaza-1,3-pentadiene, 1,5,5-trialkoxyl-1,3-pentadiene, 1,7-diphenyl-1,7-diaza-1,3,5-heptatriene, etc.) in a proper solvent such as methanol. The reaction may sometimes be accelerated by addition of a basic substance such as triethylamine or an acid anhydride such as acetic anhydride. More specifically, compounds of the general formula (I) can be synthesized utilizing methods disclosed in J.P. KOKOKU Nos. 39-22069, 43-3504, 52-38056, 54-38129 and 55-10059, J.P. KOKAI Nos. 49-99620 and 59-16834, U.S. Pat. No. 4,181,225, etc.

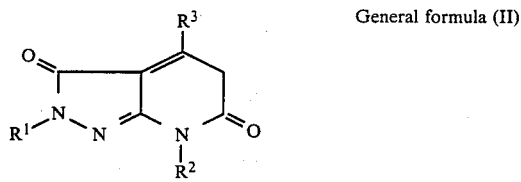

General formula (II)

wherein R¹, R² and R³ have the same meanings as defined in the general formula (I).

A compound represented by the general formula (II) can be synthesized by heating a compound represented by the following general formula (III) and a compound represented by the general formula (IV) in an acidic condition:

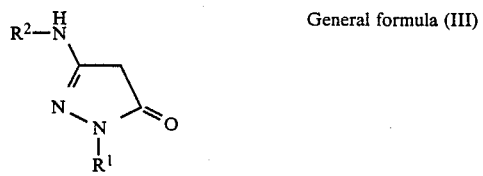

General formula (III)

wherein R¹ and R² have the same meanings as defined in the general formula (I);

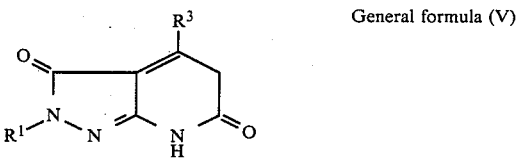

General formula (IV)

wherein R³ has the same meaning as defined in the general formula (I), and R⁴ represents an alkyl group or an aryl group.

A compound represented by the general formula (II) can also be synthesized by alkylating, arylating or acylating a dioxopyrazolopyridine compound (general formula (V)) disclosed in J.P. KOKAI No. 52-112,626:

General formula (V)

wherein R¹ and R² have the same meanings as definied in the general formula (I).

As a matter of course, it is possible to convert a functional group on a compound represented by the general formula (I) or the general formula (II) to another functional group according to a known method.

Synthesis examples of compounds of the present invention are exhibited below.

SYNTHESIS EXAMPLE 1 (COMPOUND 1)

A mixture of 7.4 g of 3-methylamino-1-(4-sulfophenyl)pyrazolin-5-on triethylamine salt, 3.1 g of ethyl acetoacetate and 40 ml of glacial acetic acid was refluxed with heating for 8 hours, and the reaction solution was concentrated to about ⅓ of the initial volume. Isopropanol (50 ml) was added thereto to deposite crystals which was then recrystallized from methanol to obtain 3.9 g of 4,7-dimethyl-2-(4-sulfophenyl)pyrazolo[3,4-b]pyridine-3,6-done triethylamine salt. A mixture of 3,5 g of these crystals, 2.6 ml of ethyl orthoformate and 30 ml of nitrobenzene was refluxed with heating for 30 minutes and cooled to about 75° C. A solution of 2 g potassium iodide in 25 ml of methanol was dropwise added thereto, followed by stirring for additional one hour. Ethanol (50 ml) was added to this reaction solution, and the deposited crystals were recovered by filtration and washed with ethanol to obtain 1.2 g of Compound 1 as black crystals. Melting point 300° C. or more, $\lambda_{max}^{H_2O}$ 599 nm.

SYNTHESIS EXAMPLE 2 (COMPOUND 2)

A mixture of 8.9 g of 3-anilino-1-(2-sulfobenzyl)-pyrazolin-5-one triethylamine salt, 5.6 g of ethyl oxalate and 40 ml of glacial acetic acid was refluxed with heating for 10 hours, and the reaction solution was concentrated to about ⅓ of the initial volume. Isopropanol (50 ml) was added thereto to deposit crystals which was recrystallized from ethanol to obtain 2.9 g of 4-ethoxycarbonyl-5-phenyl-2-(2-sulfobenzyl)pyrazolo[3,4-b]pyridine-3,6-dione triethylamine salt. These crystals (2.9 g) was added to 3.6 ml of an aqueous 20% potassium hydroxide solution, and refluxed with heating for 2 hours. The reaction solution was cooled to room temperature, 1.5 ml of 36% hydrochloric acid was added, and the mixture was allowed to stand overnight. The deposited crystals were recovered by filtration and washed with methanol to obtain 2.3 g of 4-carboxy-5-phenyl-2-(2-sulfobenzyl)pyrazolo[3,4-b]pyridine-3,6-dione potassium salt. A mixture of 2.2 g of these crystals, 1.5 ml of ethyl orthoformate and 20 ml of N,N-diemethylformamide was refluxed with heating for one hour, and cooled to room temperature. A solution of 0.7 g of potassium acetate in 5 ml of methanol was added thereto, followed by stirring for one hour. The deposited crystals were recovered by filtration and washed with methanol to obtain 1 g of Compound 2 as black crystals. Melting point 300° C. or more, $\lambda_{max}^{H_2O}=630$ nm.

SYNTHESIS EXAMPLE 3 (COMPOUND 7)

A mixture of 4.3 g of 4,7-dimethyl-2-(4-sulfophenyl)-pyrazolo[3,4-b]pyridine-3,6-dione triethylamine salt as synthesized in a manner similar to that of synthesis example 1, 1.1 g of malonaldehyde dianil, 2.8 ml of triethylamine, 30 ml of methanol and 3 ml of acetic anhydride was stirred at room temperature for 10 hours, a solution of 1.5 g of potassium acetate in 10 ml of methanol was added thereto, and the mixture was stirred at room temperature for additional one hour. The deposited crystals were recovered by filtration and recrystallized from a methanol-water mixed solvent (methanol/water=4/1) to obtain 2.2 g of Compound 7 as blackish purple crystals. Melting point 300° C. or more, $\lambda_{max}^{H_2O}$ 651 nm.

SYNTHESIS EXAMPLE 4 (COMPOUND 33)

1-(4-Sulfophenyl)-3-anilinopyrazolin-5-one triethylamine salt (8.6 g) and 3.5 g of ethyl acetacetate were added to 50 ml of glacial acetic acid and refluxed with heating for 8 hours, and then the reaction solution was concentrated to about ⅓ of the volume. Isopropanol (80 ml) was added thereto to deposit crystals which was then recrystallized from methanol to obtain 3.5 g of 4-methyl-7-phenyl-2-(4-sulfophenyl)pyrazolo[3,4-b]pyridine-3,6-dione triethylamine salt. These crystals (3 g), 0.9 g of glutacondialdehyde dianil hydrochloride, 1.3 ml of triethylamine, 1.1 ml of acetic anhydride and 20 ml of N,N-dimethylformamide were mixed and stirred at room temperature for one hour and then at 50° C. for 2 hours. The reaction solution was cooled to room temperature and a solution of 1.8 g of potassium acetate in 10 ml of methanol, followed by one hour stirring. The deposited crystals were recovered by filtration and recrystallized from a methanol-water mixed solvent (methanol/water=3/1) to obtain 1.1 g of Compound 33 as dark bluish, green crystals. Melting point 300° C. or more, $\lambda_{max}^{CH_3OH}=767$ nm.

When dyestuffs represented by the general formula (I) are used as a filter dyestuff, an irradiation-inhibiting dyestuff or an antihalation dyestuff, they are used in an arbitrary effective amount but it is preferable to use them so that optical density thereof ranges from 0.05 to 3.0. The dyestuffs may be added in any of steps before coating.

Dyestuffs of the invention can be dispersed into emulsion layers or other hydrophilic colloidal layers (an intermediate layer, a protective layer, an antihalation layer, a filter layer, etc.) according to various known methods, for example, methods described below:

(1) A method where dyestuffs of the invention are directly dissolved or dispersed in an emulsion layer or a hydrophilic colloidal layer, or a method where dyestuffs are dissolved or dispersed in an aqueous solution or solvent and the solution or dispersion is used for an emulsion layer or a hydrophilic colloidal layer.

The dyestuffs may also be added to an emulsion as a solution of them, for example, in methyl alcohol, ethyl alcohol, propyl alcohol, methyl cellosolve, a halogenated alcohol disclosed in J.P. KOKAI No. 48-9715 or U.S. Pat. No. 3,756,830, acetone, water, pyridine, etc. or a mixed solvent thereof.

(2) A method of locating dyestuffs of the invention in a desired layer by making a hydrophilic polymer having an electron charge opposite to the dyestuff ions exist in the layer as a mordant to allow the polymer to interact with the dyestuff molecules.

The polymer mordants include polymers having secondary and tertiary amino groups, polymers having nitrogen-containing heterocyclic parts, polymers having quaternary cationic groups on these groups or parts, etc., and have preferably 5,000 or more, particularly preferably 10,000 or more molecular weight.

There can be for example be mentioned as the polymer mordants, vinylpyridine polymers and vinylpyridinium cationic polymers disclosed in U.S. Pat. No. 2,548,564; vinylimidazolium cationic polymers disclosed in U.S. Pat. No. 4,124,386; polymer mordants which can be cross-linked with gelatin, etc. as disclosed in U.S. Pat. No. 3,625,694; aqueous sol type mordants disclosed in U.S. Pat. No. 3,958,995, J.P. KOKAI No. 54-115,228, etc.; water insoluble mordants disclosed in U.S. Pat. No. 3,898,088; reactive mordants capable of making covalent bond to dyestuffs, as disclosed in U.S. Pat. No. 4,168,976, etc.; polymers derived from ethylenic unsaturated compounds having a dialkylaminoalkyl ester residue, as disclosed in UK Patent No. 685,475; products obtained by the reaction of polyvinyl alkyl ketone with aminoquanidine, as disclosed in UK Patent No. 850,281; polymers derived from 2-methyl-1-vinylimidazole, as disclosed in U.S. Pat. No. 3,445,231; etc.

(3) A method of dissolving dyestuffs of the invention using surfactant(s).

Useful surfactants include oligomer or polymer surfactants. Detail of the oligomer or polymer surfactants is disclosed in pages 19 to 27 of J.P. KOKAI No. 60-158,437.

Further, for example, hydrozol of lipophilic polymers disclosed in J.P. KOKOKU No. 51-39835 can be added to the thus obtained dispersions of dyestuffs of the invention in hydrophilic colloids.

Hydrophilic colloids representatively include gelatin, but there can be used any other hydrophilic colloids which have hitherto been known to be used for photograph.

Silver halide emulsions used in the invention can be any of silver bromide, silver iodobromide, silver iodochlorbromide, silver chlorobromide and silver chloride.

Silver halide grains usable in the invention are properly those which have a regular crystal shape such as cube or octahedron, or those having an irregular crystal shape such as sphere or tabular shape, or those having a composite shape of these crystal shapes, and can further be composed of mixture of grains having various crystal shapes. However, it is preferable to use grains having a regular crystal shape.

Silver halide grains used in the invention may have different phases between the inner part and the surface layer, or may be composed of a homogeneous phase through them. Further, the grains may be those wherein latent images are mainly formed on the surface (for example, negative type emulsions) or those wherein latent images are mainly formed inside the grains (for example, internal latent image type emulsions and previously fogged direct reversal type emulsions). Grains are preferable wherein latent images are mainly formed on the surface.

Silver halide emulsions to be used in the invention are preferably either tabular grain emulsions wherein the grains have a thickness of 0.5 or less preferably 0.3 or less, and preferably have a diameter of 0.6 or more, and wherein grains having an average aspect ratio of 5 or more occupy 50% or more of total projected area; or monodispersed emulsions wherein statistical variation coefficient (value $(s/\bar{d})$ obtained by dividing standard deviation S when projected area is supposed to be approximate to a circle by diameter $\bar{d}$) is 20% or less. The silver halide emulsions may further be a mixture of two or more of tubular grain grains and monodispersed emulsions.

Photographic emulsions usable in the invention can be prepared by methods disclosed in P. Glafkides, Chimie er Physique Photographeque (published by PAUL MONTEL Co., 1967), G. F. Duffin, Photographic Emulsion Chemistry (published by FOCAL PRESS Co., 1966), V. L. Zelikman, Making and Coating Photographic Emulsion (published by THE FOCAL PRESS Co., 1964), etc.

Further, in order to control growth of grains during formation of silver halide grains, a silver halide-dissolving agent, for example ammonia, potassium thiocyanate, ammonium thiocyanate, a thioether compound (disclosed for example in U.S. Pat. Nos. 3,271,157, 3,754,628, 38704,130, 4,297,439, 4,276,374 or the like), a thione compound (disclosed for example in J.P. KOKAI No. 53-144,319, 53-82408, 55-77737 or the like), an amine compound (disclosed for example in J.P. KOKAI No. 54-100,717 or the like), or the like can be used.

In a stage of formation or physical ripening of silver halide grains, a cadmium salt, a zinc salt, a thallium salt, an iridium salt or a complex salt thereof, rhodium salt or a complex salt thereof, an iron salt or an iron complex salt, or the like may be made to coexist.

Silver halide emulsions are usually chemically sensitized. For chemical sensitization, a method disclosed, for example, in Die Grundlagen der Photographischen Prozesse mit Silberhalo geniden, edited by H. Frieser, Akademische Verlagsgesellschaft, 1968, pages 675 to 734 can be used.

That is, a sulfur sensitization method using a sulfur-containing compound capable of reacting with an active gelatin or iron (for example, thiosulfate, a thiourea, a mercapto compound, a rhodanine); a reduction sensitization method using a reducing substance (for example, a tin (II) salt, an amine, a hydrazine derivative, formamidinesulfinic acid, a silane compound), a noble metal sensitization method using a noble metal compound (for example, a gold complex salt, a complex salt of a metal of the VIII group in periodic table such as Pt, Ir or Pd), or the like can be used alone or in combination.

Siler halide grains to be used in the invention can be spectrally sensitized, according to necessity, by hitherto known methine dyes such as cyanine dyes or merocyanine dyes or other dyes.

Various compounds can be contained in silver halide photographic emulsions used in the invention for the purpose of inhibiting fog during preparation steps, preservation or photographic process of light-sensitive materials or for the purpose of stabilizing photographic performances. That is, there can be added many compounds known as antifoggants or stabilizing agents, for example, thiazoles (for example, benzothiazolium salts); nitroindazoles; triazoles; benzotriazoles; benzimidazoles (particularly, nitro- or halogen-substituted benzimidazoles); heterocyclic mercapto compounds, for example mercaptothiazoles, mercaptobenzothiazoles, mercaptoenzimidazoles, mercaptothiadiazoles, mercaptotetrazoles (particularly, 1phenyl-5-mercaptotetrazole), mercaptopyrimidines; the above heterocyclic mercapto compounds each having a water soluble group such as a carboxyl group or a sulfo group; thioketone compounds (for example, oxazolinethione); azaindenes, for example tetrazaindenes (particularly, 4-hydroxy substituted (1, 3, 3a, 7) tetrazaindenes); benzenethiosulfonic acids; benzenesulfinic acid; or the like.

Silver halide photographic emulsions of the invention can obtain color-forming couplers such as cyan dye-forming couplers, magenta dye-forming couplers or yellow dye-forming couplers, and compounds which disperse couplers.

That is, compounds may be contained therein which can form dyes by oxidation coupling with aromatic primary amine developing agents (for example, phenylenediamine derivatives or aminophenol derivatives) in color developing process. For example, magenta dye-forming couplers include 5-pyrazolone coupler, pyrazolobenzimidazole coupler, cyanoacetylcoumarone coupler, pyrazolotriazole coupler, open-chaned acylacetonitrile couplers, etc. yellow dye-forming couplers include acylacetamide couplers (for example, benzoylacetanilides, pivaloylacetanilides), etc., and cyan dye-forming couplers include naphthol couplers, phenol couplers, etc. These couplers are preferably couplers which each have a hydrophobic group called a ballast group and are non-diffusive. Either of 4-equivalent and 2-equivalent couplers based on silver ion can be used as dye-forming couplers. Further, dye-forming couplers may be colored couplers which have color correction effect or couplers which release development inhibitors with progress of development (so-called DIR couplers).

Further, silver halide photographic emulsions of the invention may contain besides DIR couplers colorless compound-forming DIR coupling compounds which form colorless coupling reaction products and release development inhibitors at the same time.

Photographic emulsions of the invention may contain for the purpose of sensitivity increase, contrast increase or development acceleration, for example polyalkylene oxides or derivatives thereof such as ethers, esters or amines; thioether compounds; thiomorpholine compounds; quaternary ammonium salts; urethane derivatives, urea derivatives; imidazole derivatives; 3-pyrazolidone derivatives; or the like.

Silver halide photographic emulsions of the invention may further contain known water soluble dyestuffs other than dyestuffs disclosed in the invention (for example, oxonol dyestuffs, hemioxonol dyestuffs or merocyanine dyes), as filter dyestuffs or irradiation inhibitors or for other various purposes. Further, known cyanine dyes, merocyanine dyes, or himicyanine dyes other than dyestuffs disclosed in the invention may be used together as spectral sensitizing dyes.

Photographic emulsions of the invention may contain various surfactants for various purposes such as coating aids, antistatic purpose, slipping improvement, emulsification and dispersion, adhesion inhibition, improvement of photographic performances (for example, development acceleration, contrast development, sensitization) or the like.

As for fading inhibitors, hardening agents, anticolorfoggants, ultraviolet absorbers, protective colloids such as gelatin and other various additives which can be used for light-sensitive materials of the invention, there is a specific disclosure, for example, in Research Disclosure vol. 176 (1978, XII) RD-17643.

Finished emulsions are applied onto appropriate supports such as boryta papers, resin-coated papers, synthetic papers, triacetate films, polyethylene terephthalate films or other plastic bases or glass plates.

There can be mentioned as silver halide photographic light-sensitive materials of the invention color positive films, color papers, color negative films, color reversal films (coupler is contained or not contained), photographic light-sensitive materials for making printing plates (for example, litho-films, litho-duplicating films and the like), light-sensitive materials for cathode ray tube display (for example, light-sensitive materials for emulsion X-ray recording, or light-sensitive materials for direct or indirect photographing), light-sensitive materials for silver salt diffusion transfer process, light-sensitive materials for color diffusion transfer process, light-sensitive materials for inhibition transfer process, light-sensitive materials used in silver dye bleaching process, light-sensitive materials for recording print-out image, light-sensitive materials for direct print image, light-sensitive materials for heat development, light-sensitive materials for physical development, etc.

Exposure to light for obtaining photographic images may be carried out using usual methods. That is any of known various light sources such as natural light (sunlight), a tungsten lamp, a fluorescent lamp, a mercury lamp, a xenon arc lamp, a carbon arc lamp, a xenon flash lamp, cathode ray tube flying spot and the like. Exposure time is usually 1/1000 to 30 seconds, but can also be a time shorter than 1/1000 second, for example 1/10$^4$ to 1/10$^6$ second in case of using a xenon flash lamp or a cathode ray tube, or can further be a time longer than 30 seconds. It is possible, according to necessity, to adjust spectral composition of light used in exposure using a color filter. Laser lights can also be used for exposure. Further, exposure may be carried out by light emitted from fluorescent matters excited with electron ray, X ray, $\gamma$ ray, $\alpha$ ray or the like.

In photographic process of light-sensitive materials prepared using the present invention, both known methods and known processing solutions disclosed, for example, in Research Disclosure, No. 176, pages 28 to 30 (RD-17643) can be applied. This photographic process may be either of photographic process for forming silver images (black-and-white photographic process) and photographic process for forming dye images (color photographic process) according to purpose. Processing temperature is usually selected from 18° to 50° C., but may be a temperature lower than 18° C. or higher than 50° C.

Color photographic processing can be carried out by any of methods therefor without particular restriction. Representative examples therefor include a method where after image-wise exposure to light color photographic light-sensitive materials are color-developed and bleach-fixed, and, if necessary, further water washed and subjected to stabilizing process; a method where after image-wise exposure to light color photographic light-sensitive materials are color-developed and subjected to separate processes about bleaching and fixing, and, if necessary, further water washed and subjected to stabilizing process; a method where after image-wise exposure to light color photographic light-sensitive materials are developed with a developing solution containing a black-and-white developing agent, subjected to unform exposure to light, color-developed and bleach-fixed, and, if necessary, further water washed and subjected to a stabilizing process; and a method where after image-wise exposure to light color photographic light-sensitive materials are developed with a developing solution containing a black-and-white developing agent, further developed with a color developing solution containing a fogging agent (for example, sodium borohydride) and bleach-fixed, and, if necessary, water washed and subjected to a stabilizing process.

Aromatic primary amine color developing agents used in color developing solutions in the invention include those known and widely used in various color photographic processes. These developing agents include aminophenol series derivatives and p-phenylenediamine series derivatives. Preferred examples thereof are p-phenylenediamine derivatives, and representative examples thereof are listed below but not limited thereto.

| | |
|---|---|
| D-1 | N,N-diethyl-p-phenylenediamine |
| D-2 | 2-amino-5-diethylaminotoluene |
| D-3 | 2-amino-5-(N-ethyl-N-laurylamino)toluene |
| D-4 | 4-[N-ethyl-N-($\beta$-hydroxyethyl)amino]aniline |
| D-5 | 2-methyl-4-[N-ethyl-N-($\beta$-hydroxyethyl)amino]-aniline |
| D-6 | N-ethyl-N-($\beta$-methanesulfonamidoethyl)-3-methyl-4-aminoaniline |
| D-7 | N-(2-amino-5-diethylaminophenylethyl)methane-sulfonamide |
| D-8 | N,N-dimethyl-p-phenylenediamine |
| D-9 | 4-amino-3-methyl-N-ethyl-N-methoxyethylaniline |
| D-10 | 4-amino-3-methyl-N-ethyl-N-$\beta$-ethoxyethylaniline |
| D-11 | 4-amino-3-methyl-N-ethyl-N-$\beta$-butoxyethylaniline |

These p-phenylenediamine derivatives may be salts such as sulfates, hydrochlorides, sulfites or p-toluenesulfonates. The above compounds are disclosed in U.S. Pat. Nos. 2,193,015, 2,552,241, 2,566,271, 2,592,364, 3,656,950, 3,698,525, etc. Amount of the aromatic primary amine color developing agents to be used is preferably about 0.1 to about 20 g, more preferably about 0.5 to about 10 g per 1 l of the developing solution.

Color developing solutions used in the invention can contain hydroxylamines, which is well known.

Though hydroxylamines can be used as free amine form in the color developing solution, it is more general to use them in the form of water soluble salts with acids. General examples of such salts are sulfates, oxalates, chlorides, phosphates, carbonates, acetates, etc. Hydroxylamines may either be substituted or unsubstituted, and the nitrogen atom of hydroxylamines may be substituted by alkyl group(s).

Amount of hydroxylamines to be added is preferably 0 to 10 g, more preferably 0 to 5 g per 1 l of the color developing solutions. Smaller amount thereof is preferable so long as stability of the color developing solution is held.

Color developing solutions used in the invention preferably contain as a preservative a sulfite such as sodium sulfite, potassium sulfite, sodium bisulfite, potassium bisulfite, sodium metasulfite or potassium metasulfite, or a carbonyl-sulfurous acid adduct. Amount of these preservatives to be added is preferably 0 to 20 g/l, more preferably 0 to 5 g/l, and smaller amount is preferred so long as stability of the color developing solutions is held.

There can be mentioned as other preservatives aromatic polyhydroxy compounds disclosed in J.P. KOKAI Nos. 52-49828, 56-47038, 56-32140 and 59-160,142 and U.S. Pat. No. 3,746,544, hydroxyacetones disclosed in U.S. Pat. No. 3,615,503 and U.K. Patent No. 1,306,176, α-aminocarbonyl compounds disclosed in J.P. KOKAI Nos. 52-143,020 and 53-89425, various metals disclosed in J.P. KOKAI Nos. 57-44148 and 57-53749, etc., various saccharides disclosed in J.P. KOKAI No. 52-102,727, hydroxamic acids disclosed in J.P. KOKAI No. 52-27638, α, α'-dicarbonyl compounds disclosed in J.P. KOKAI No. 59-160,141, salicylic acids disclosed in J.P. KOKAI No. 59-180,588, alkanolamines disclosed in J.P. KOKAI No. 54-3532, poly(alkyleneimines) disclosed in J.P. KOKAI No. 56-94349, gluconic acid derivatives disclosed in J.P. KOKAI No. 56-75647, etc. These preservatives may be used in combination of two or more of them, according to necessity. Particularly preferable is addition of 4,5-dihydroxy-m-benzenesulfonic acid, poly(ethyleneimine) and triethanolamine, etc.

The pH value of color developing solutions used in the invention is preferably 9 to 12, more preferably 9 to 11, and can contain other known compounds as developing solution components.

It is preferable to use various buffering agents to maintain the above pH values. There can be used as buffering agents carbonates, phosphates, borates, tetraborates, hydroxybenzoates, glycine salts, N,N-dimethylglycine salts, leucine salts, norleucine salts, guanine salts, 3,4-dihydroxyphenylalanine salts, alanine salts, aminobutyrates, 2-amino-2-methyl-1,3-propanediol salts, valine salts, proline salts, trishydroxyaminomethane salts, lysine salts, etc. Particularly, carbonates, phosphates, tetraborates and hydroxybenzoates are excellent in solubilizing ability and buffering ability in high pH range of pH 9.0 or more, free from ill influences on photographic performances (fogging, etc.) when added to color developing solutions, and have advantages such as cheapness, and thus it is particularly preferable to use these buffering agents.

Specific examples of these buffering agents are sodium carbonate, potassium carbonate, sodium bicarbonate, potassium bicarbonate, sodium tertiary phosphate, potassium tertiary phosphate, disodium hydrogen phosphate, dipotassium hydrogen phosphate, sodium borate, potassium borate, sodium tetraborate (borax), potassium tetraborate, sodium o-hydroxybenzoate (sodium salicylate), potassium o-hydroxybenzoate, sodium 5-sulfo-2-hydroxybenzoate (sodium 5-sulfosalicylate), potassium 5-sulfo-2-hydroxybenzoate (potassium 5-sulfosalicylate), etc. However, the invention should not be limited to these compounds.

Amount of these buffering agents to be added to the color developing solutions is preferably 0.1 mol/l or more, particularly preferably 0.1 to 0.4 mol/l.

Further, various chelating agents can be used in the color developing solutions as a calcium or magnesium precipitation-inhibiting agent or for stability enhancement of the color developing solutions.

Organic acid compounds are preferable as chelating agents, and include, for example, aminopolycarboxylic acids disclosed in J.P. KOKOKU Nos. 48-30496 and 44-30232, organic phosphonic acids disclosed in J.P. KOKAI No. 56-97347, J.P. KOKOKU No. 56-39359 and West Germany Patent No. 2,227,639, phosphonocarboxylic acids disclosed in J.P. KOKAI Nos. 52-102,726, 53-42730, 54-121,127, 55-126,241 and 55-65956, etc., and further compounds disclosed in J.P. KOKAI Nos. 58-195,845 and 58-203,440 and J.P. KOKOKU No. 53-40900, etc. Specific examples of the chelating agents are exhibited below, but the chelating agents should not be limited thereto:

nitriloaceticacid,
diethyleneaminopentaacetic acid,
ethylenediaminetetraacetic acid,
triethylenetetraminehexaacetic acid,
N,N,N,-trimethylenephosphonic acid,
ethylenediamine-N,N,N',N'-tetramethylenephosphonic acid,
diamino-2-propanol-4-acetic acid,
transcyclohexanediaminetetraacetic acid,
nitrilotripropionic acid,
1,2-diaminopropanetetraacetic acid,
hydroxyethyliminodiacetic acid,
glycoletherdiaminetriacetic acid,
ethylenediamineorthohydroxyphenylacetic acid,
2-phosphonobutane-1,2,4-tricarboxylic acid,
1-hydroxyethane-1,1-diphosphonic acid,
N,N'-bis(2-hydroxybenzyl)ethylenediamine-N,N'-diacetic acid.

These chelating agents may be used in combination of two or more of them according to necessity. Amount of these chelating agents to be added may be an amount sufficient for sequestering metal ions in the color developing solutions, for example 0.1 to 10 g per 1 l of the solutions.

Any development accelerator can be added to the color developing solutions according to necessity.

There can be added as development accelerators according to necessity besides benzyl alcohol thioether series compounds disclosed J.P. KOKOKU Nos. 37-16088, 37-5987, 38-7826, 44-12380 and 45-9019 and U.S. Pat. No. 3,813,247, etc., p-phenylenediamine series compounds disclosed in J.P. KOKAI Nos. 52-49829 and 50-15554, quaternary ammonium salts disclosed in J.P. KOKAI No. 50-137,726, J.P. KOKOKU No. 44-30074, J.P. KOKAI Nos. 56-156,826 and 52-43429, etc., p-aminophenols disclosed in U.S. Pat. Nos. 2,610,122 and 4,119,462, amine series compounds disclosed in U.S. Pat. Nos. 2,494,903, 3,128,182, 4,230,796 and 3,253,919, J.P. KOKOKU No. 41-11431, U.S. Pat. Nos. 2,482,546, 2,596,926 and 3,582,346, etc., polyalkylene oxides disclosed in J.P. KOKOKU Nos. 37-16088 and 42-25201, U.S. Pat. No. 3,128,183, J.P. KOKOKU Nos. 41-11431 and 42-23883, and U.S. Pat. No. 3,532,501, etc., and further 1-phenyl-3-pyrazolidones, hydrazines, mesoionic type compounds, thione type compounds, imidazoles, etc. Thioether series compounds and 1-phenyl-3-pyrazolidones are particularly preferred.

Arbitrary antifoggant(s) can be added to color developing solutions of the invention, according to necessity. There can be used as the antifoggants alkali metal halides such as potassium bromide, sodium chloride and potassium iodide and organic antifoggants. There can be used as organic antifoggants, for example, nitrogen-containing heterocyclic compounds such as benzotriazole, 6-nitrobenzimidazole, 5-nitroisoindazole, 5-methylbenzotriazole, 5-nitrobenzotriazole, 5-chlorobenzotriazole, 2-thiazolylbenzimidazole and 2-thiazolylmethylbenzimidazole; mercapto-substituted heterocyclic compounds such as 2-mercaptobenzimidazole and 2-mercaptobenzothiazole; and mercapto-substituted aromatic compounds such as thiosalicylic acid. These antifoggants may dissolve out during processing from silver halide color photographic light-sensitive materials and accumulate in the color developing solutions, but it is preferable in view of lowering of discharge amount that the accumulated amount is smaller.

Color developing solutions of the invention preferably contain fluorescent whitener(s). 4,4-Diamino-2,2'-disulfostilbene series compounds are preferable as fluorescent whiteners. Amount of fluorescent whitener(s) is 0 to 5 g/l, preferably 0.1 to 2 g/l.

Further, there can be added according to necessity various surfactants such as alkylphosphonic acids, arylphosphonic acids, aliphatic carboxylic acids or aromatic carboxylic acids.

Processing temperature of color developing solutions in the invention is preferably 30° to 50° C., more preferably 33° to 42° C. Amount of replenishers is 30 to 2000 ml, preferably 30 to 1500 ml per 1 m² of the light-sensitive materials. It is preferable in view of lowering of waste liquid amount that the amount of replenisher is smaller.

Ferric ion complex salts are generally used as bleaching agents for bleaching solutions or bleach-fixing solutions used in the invention. Ferric ion complex salts are complexes of ferric ion with a chelating agent such as an aminopolycarboxylic acid, an aminopolyphosphonic acid or a salt thereof or the like. Aminopolycarboxylates or aminopolyphosphonates are salts of aminopolycarboxylic acids or aminopolyphosphonic acids with alkali metals, ammonium or water soluble amines. Alkali metals include sodium, potassium, lithium, etc., and water soluble amines include alkylamines such as methylamine, diethylamine, triethylamine and butylamine; alicyclic amines such as cyclohexylamine; arylamines such as aniline and m-toluidine; and heterocyclic amines such as pyridine, morpholine and piperidine.

The following compounds can be mentioned as representative examples of chelating agents such as these aminopolycarboxylic acids, aminopolyphosphonic acids and their salts, but the chelating agents are not limited to these exemplified compounds:
ethylenediaminetetraacetic acid,
disodium ethylenediaminetetraacetate,
diammonium ethylenediaminetetraacetate,
tetra(trimethylammonium) ethylenediaminetetraacetate,
tetrapotassium ethylenediaminetetraacetate,
tetrasodium ethylenediaminetetraacetate,
trisodium ethylenediaminetetraacetate,
diethylenetriaminepentaacetic acid,
pentasodium diethylenetriaminepentaacetate,
ethylenediamine-N-($\beta$-oxyethyl)-N,N',N'-triacetic acid,
trisodium ethylenediamine-N-($\beta$-oxyethyl)-N,N',N'triacetate,
triammonium ethylenediamine-N-($\beta$-oxyethyl)-N,N',N'-triacetate,
propylenediaminetetraacetic acid,
disodium propylenediaminetetraacetate,
nitrilotriacetic acid,
trisodium nitrilotriacetate,
cyclohexanediaminetetraacetic acid,
disodium cyclohexanediaminetetraacetate,
iminodiacetic acid,
dihydroxyethylglycine,
ethyletherdiaminetetraacetic acid,
glycoletherdiaminetetraacetic acid,
ethylenediaminetetrapropionic acid,
phenylenediaminetetraacetic acid,
1,3-diaminopropanol-N,N,N',N'-tetramethylenephosphonic acid,
ethylenediamine-N,N,N',N'-tetramethylenephosphonic acid,
1,3-propylenediamine-N,N,N',N'-tetramethylenephosphonic acid, etc.

The ferric ion complex salts may be used in the form of complex salts, or they may also be formed in a solution using a ferric salt such as ferric sulfate, ferric chloride, ferric nitrate, ammonium ferric sulfate or ferric phosphate together with a chelating agent such as an aminopolycarboxylic acid, an aminopolyphosphonic acid or a phosphonocarboxylic acid. When used in the form of complex salts, they may be used alone or in combination of two or more of them. Further, when complex salts are formed in solutions using ferric salts and chelating agents, the ferric salts and chelating agents may be used alone or in combination of two or more of them, respectively. Further, in either case chelating agents may be used in excess, i.e. in an amount more than that necessary for forming ferric ion complex salts. Aminopolycarboxylic acid-ferric complexes are preferable among ferric ion complex salts. Amount of ferric ion complex salts to be added is 0.01 to 1.0 mol/l, preferably 0.05 to 0.50 mol/l.

Bleach accelerators can be used in the bleaching solutions or bleach-fixing solutions, according to necessity. There can be mentioned as specific examples of useful bleach accelerators, compounds having mercapto group(s) or disulfido group(s) disclosed in U.S. Pat. No. 3,893,858, West Germany Patent Nos. 1,290,812 and 2,059,988, J.P. KOKAI Nos. 53-32736, 53-57831, 53-37418, 53-65732, 53-72623, 53-95630, 53-95631, 53-104,232, 53-124,424, 53-141,623 and 53-28426, Research Disclosure No. 17129 (July, 1978), etc., thiazolidine derivatives disclosed in J.P. KOKAI No. 50-140,129, thiourea derivatives disclosed in J.P. KOKOKU No. 45-8506, J.P. KOKAI Nos. 52-20832 and 53-32735 and U.S. Pat. No. 3,706,561, iodides disclosed in West Germany Patent No. 1,127,715 and J.P. KOKAI No. 58-16235, polyethylene oxides disclosed in West Germany Patent Nos. 966,410 and 2,748,430, polyamine compounds disclosed in J.P. KOKOKU No.

45-8836, and further compounds disclosed in J.P. KOKAI Nos. 49-42434, 49-59644, 53-94927, 54-35727, 55-26506 and 58-163,940, and iodine, bromine, and the like. Among them, compounds having mercapto group(s) or disulfido group(s) are preferable in view of large bleaching effect, and compounds disclosed in U.S. Pat. No. 3,893,858, West Germany Patent No. 1,290,812 and J.P. KOKAI No. 53-95630 are particularly preferable.

Further, bleaching solutions bleaching solutions or bleach-fixing solutions of the invention can contain rehalogenating agent(s), for example, bromide(s) such as potassium bromide, sodium bromide or ammonium bromide, chloride(s) such as potassium chlorides, sodium chloride or ammonium chloride, or iodide(s) such as ammonium iodide. Further, there can be added according to necessity at least one of inorganic acids, organic acids, and alkali metal or ammonium salts thereof having a pH buffering ability such as boric acid, borax, sodium metaborate, acetic acid, sodium acetate, sodium carbonate, potassium carbonate, phosphorous acid, phosphoric acid, sodium phosphate, citric acid, sodium citrate and tartaric acid, and further corrosion inhibitor(s) such as ammonium nitrate or guanidine.

Fixing agents used in bleach-fixing solutions or fixing solutions in the invention may be known fixing agents, namely water soluble silver halides-dissolving agents, for example, thiosulfates such as sodium thiosulfate and ammonium thiosulfate; thiocyanates such as sodium thiocyanate and ammonium thiocyanate; thioether compounds such as ethylenebisthioglycolic acid and 3,6-dithia-1,8-octanediol; and thioureas, and these fixing agents can be used alone or in combination of two or more of them. Further, there can also be used special bleach-fixing solutions composed of combination of fixing agent(s) with large amount of halide(s) such as potassium iodide, as disclosed in J.P. KOKAI No. 55-155,354. In the invention thiosulfates, particularly ammonium thiosulfate are preferably used as the fixing agent.

Amount of fixing agent(s) is preferably in the range of 0.3 to 2 mol, more preferably in the range of 0.5 to 1.0 mol per 1 l of the bleach-fixing solution or fixing solution.

The pH range of bleach-fixing solutions or fixing solutions in the invention is preferably 3 to 10, particularly preferably 4 to 9. Though pH lower than this value enhances desilvering efficiency, but it accelerates the deterioration of the solutions and the formation of leuco cyan dyes. On the other hand, pH higher than the above value retards desilvering and makes stain liable to be formed.

There can be added according to necessity for pH adjustment hydrochloric acid, sulfuric acid, nitric acid, acetic acid (glacial acetic acid), bicarbonates, ammonia, potassium hydroxide, sodium hydroxide, sodium carbonate, potassium hydroxide, etc.

The bleach-fixing solutions can further contain various fluorescent whitener(s), antiforming agent(s) or surfactant(s), or organic solvent(s) such as polyvinylpyrrolidone or methanol.

Bleach-fixing solutions or fixing solutions in the invention contain as preservatives sulfite ion-releasing compound(s) such as sulfite(s) (e.g., sodium sulfite, potassium sulfite or ammonium sulfite), bisulfite(s) (e.g., ammonium bisulfite, sodium bisulfite or potassium bisulfite), metabisulfite(s) (e.g., potassium metabisulfite, sodium metabisulfite or ammonium metabisulfite). Concentration of these compound(s) is preferably about 0.02 to 0.50 mol/l, more preferably 0.04 to 0.40 mol/l in terms of sulfite ion concentration.

Though sulfites are generally added as preservatives, there may also be added ascorbic acid, carbonyl-bisulfurous acid adduct(s), carbonyl compound(s) or the like.

Further, buffering agent(s), fluorescent whitener(s), chelating agent(s), antimold(s) or the like may be added according to necessity.

Next, water washing step after development of light-sensitive materials of the invention is described below.

Water amount for water washing in the water washing step can widely be varied depending on characteristics of light-sensitive materials (for example, characteristics based on the used components such as couplers), use thereof, water temperature in water washing, number (number of stages) of tank for water washing, replenishment method (e.g., counterflow, downflow) and other various conditions. Among them, relation of water washing tank number with water amount in multi-step counterflow methods can be determined according to a method disclosed in Journal of the Society of Motion Picture and Television Engineers, 64, 248–253 (May, 1955).

According to a multi-step counterflow method disclosed in the above literature, water amount for water washing can greatly be reduced, but there arise problems, for example, that bacteria proliferate by increase of residence time of water in the tanks, and the formed and suspended matters stick to the light-sensitive materials. In processing of color light-sensitive materials of the invention, there can extremely effectively be used as a method for solving these problems a method of lowering calcium and magnesium as disclosed in Japanese Patent Application No. 61-131,632. Further, there can also be used isothiazolone compounds and thiabendazoles disclosed in J.P. KOKAI No. 57-8542; chlorine type disinfectants such as sodium salt of chlorinated isocyanuric acid; and other disinfectants such as benzotriazoles disclosed in Hiroshi Horiguchi, "Bokin Bobi Zai no Kagaku" (Chemistry of Bactericides and Fungicides), "Biseibutsu no Mekkin Sakkin Bobi Gijutsu" (Sterilizing, Bactericidal and Fungicidal Techniques of Microorganisms) editted by Eisei Gijutsu Kai, and "Bokin Bobi Zai Jiten" (Encyclopedia of Bactericides and Fungicides) editted by Nippon Bokin Bobi Gakkai.

The pH value of water for water washing in processing of light-sensitive materials of the invention is 4 to 9, preferably 5 to 8. Water temperature and time of water washing can variously be varied depending on characteristics, use, etc. of light-sensitive materials, but condition range of 20 seconds to 10 minutes at 15° to 45° C., preferably 30 seconds to 5 minutes is generally selected.

Further, light-sensitive materials of the invention can also directly be processed by a stabilizing solution in place of the above water washing. In such an stabilizing process, there can be used all of known methods therefor disclosed in J.P. KOKAI Nos. 57-8543, 58-14834, 59-184,343, 60-220,345, 60-238,832, 60-239,784, 60-239,749, 61-4054 and 61-118,749, etc. There can particularly preferably be used a stabilizing bath containing 1-hydroxyethylidene-1,1-diphosphonic acid, 5-chloro-2-methyl-4-isothiazolin-3-one, bismuth compound(s), ammonium compound(s) or the like.

There is a case where a stabilizing process is carried out subsequent to the above water washing process, and there can be used for such purpose, for example, a stabilizing bath which is used as a final bath for color light-sensitive materials for photographing and contains formalin and surfactant(s).

There may be provided in each processing bath according to necessity heater(s), temperature sensor(s), liquid level sensor(s), circulating, pump(s), filter(s), various floating cover(s), various squeeze(s), nitrogen stirring apparatus(es), air stirring apparatus(es), etc.

The color photographic process can be applied to any process step so long as the process step is a process where a color developing solution is used. For example, it can be applied for process of color papers, color reversal papers, color positive films, color negative films, color reversal films, etc.

The invention is described in more detail below according to examples.

EXAMPLE 1

Multi-layered photographic papers were prepared which each comprise a paper support, both surfaces of which are laminated with polyethylene, having provided thereon layers having the following compositions respectively. Coating solutions were prepared as follows respectively. Preparation of the 1st layer coating solution.

Ethyl acetate (27.2 cc) and 7.7 cc of a solvent (Solv-1) were added to 16.6 g of a yellow coupler (ExY$_1$) and 4.4 g of a dye image stabilizer (Cpd-1) to make a solution. The solution was emulsified and dispersed in 185 cc of an aqueous 10% gelatin solution containing 8 cc of 10% sodium dodecylbenzenesulfonate. Separately, an emulsion was prepared by adding a blue-sensitive sensitizing dye as exhibited below to a monodispersed cubic silver chlorobromide emulsion (silver bromide 80.0 mol %, containing 70 g/kg Ag) having the average grain size of 0.92 $\mu$m and the variation coefficient of 8.9% in an amount of $5.0 \times 10^{-4}$ mol per 1 mole of Ag. The aforementioned emulsified dispersion and this emulsion were mixed to make a solution, whereby the 1st layer coating solution having the following composition was prepared.

Coating solutions for the 2nd to 7th layers were prepared in manners similar to that in the 1st layer coating solution.

1-Oxy-3,5-dichloro-s-triazine sodium salt was used as a gelatin hardening agent for each layer.

The following dyes were used as spectrally sensitizing dyes for respective layers.

Blue-sensitive emulsion layer

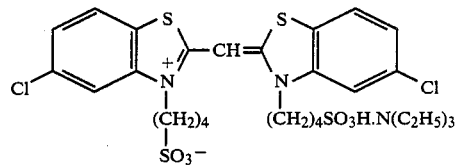

($5.0 \times 10^{-4}$ mole per 1 mol of silver halide)

Green-sensitive emulsion layer

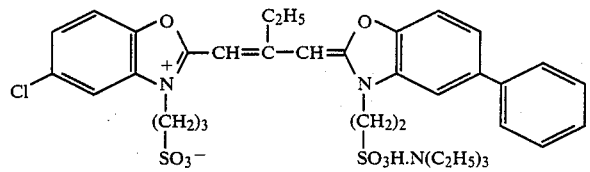

($4.0 \times 10^{-4}$ mol per 1 mol of silver halide)

and

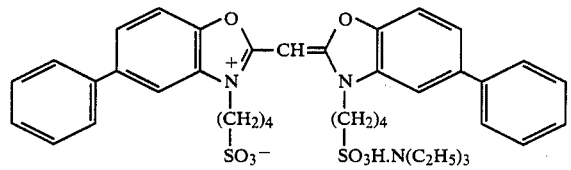

($7.0 \times 10^{-5}$ per 1 mol of silver halide)

Red-sensitive emulsion layer

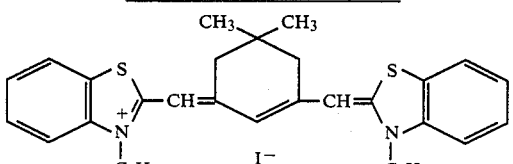

($9.0 \times 10^{-5}$ mol per 1 mol of silver halide)

-continued

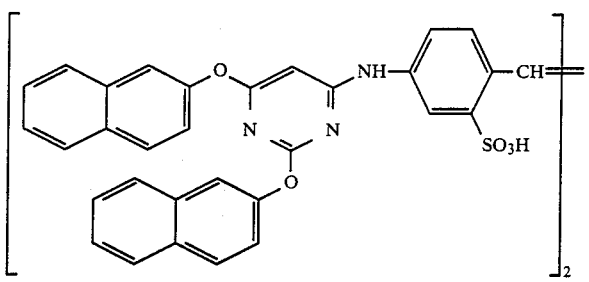

The following compound was added to the red-sensitive emulsion layer in an amount of $2.6 \times 10^{-3}$ mol per 1 mol of silver halide.

Further, 1-(5-methylureidophenyl)-5-mercaptotetrazole was added to the blue-sensitive emulsion layer, the green-sensitive emulsion layer and the red-sensitive emulsion layer respectively in an amount of $4.0 \times 10^{-6}$ mol, $3.0 \times 10^{-5}$ mol and $1.0 \times 10^{-5}$ mol per 1 mol of silver halide.

Further, 4-hydroxy-6-methyl-1,3,3a,7-tetrazaindene was added to the blue-sensitive emulsion layer and the green-sensitive emulsion layer respectively in an amount of $1.2 \times 10^{-2}$ mol and $1.1 \times 10^{-2}$ mol per 1 mol of silver halide.

Compositions of respective layers are shown below. Figures therein means coated amount (g/m$^2$). Figures in case of silver halide emulsions means coated amount in terms of silver amount:

| | |
|---|---|
| Support | |
| A paper laminated with polyethylene (containing a white pigment (TiO$_2$) and a bluish dyestuff (ultramarine)) | |
| The 1st layer (Blue-sensitive layer) | |
| Monodispersed cubic silver chlorobromide emulsion (Br 80%) having an average grain size of 0.92 μm and a variation coefficient of 8.9% | 0.26 |
| Gelatin | 1.83 |
| Yellow dye-forming coupler (ExY$_1$) | 0.72 |
| Die image stabilizer (Cpd-1) | 0.19 |
| Solvent (Solv-1) | 0.35 |
| The 2nd layer (Color mixing-inhibiting layer) | |
| Gelatin | 0.99 |
| Color mixing inhibitor (Cpd-2) | 0.08 |
| The 3rd layer (Green-sensitive layer) | |
| Monodispersed cubic silver chlorobromide emulsion (Br 80%) having an average grain size of 0.50 μm and a variation coefficient of 10.5% | 0.16 |
| Gelatin | 1.79 |
| Magenta dye-forming coupler (ExM$_1$) | 0.32 |
| Dye image stabilizer (Cpd-3) | |
| Dye image stabilizer (Cpd-4) | |
| Solvent (Solv-2) | |
| The 4th layer (ultraviolet-absorbing layer) | |
| Gelatin | 1.58 |
| Ultraviolet absorber (UV-1) | 0.62 |
| Color mixing inhibitor (Cpd-5) | 0.05 |
| Solvent (Solv-3) | 0.24 |
| The 5th layer (Red-sensitive layer) | |
| Monodispersed cubic silver chlorobromide emulsion (Br 70%) having an average grain size of 0.48 μm and a variation coefficient of 9.8% | 0.23 |
| Gelatin | 1.34 |
| Cyan dye-forming coupler (ExC$_1$) | 0.30 |
| Dye image stabilizer (Cpd-6) | 0.17 |
| Polymer (Cpd-7) | 0.40 |
| Solvent (Solv-4) | 0.23 |
| The 6th layer (ultraviolet-absorbing layer) | |
| Gelatin | 0.53 |
| Ultraviolet absorber (UV-1) | 0.21 |
| Solvent (Solv-3) | 0.08 |
| The 7th layer (Protective layer) | |
| Gelatin | 1.33 |
| Acryl-modified copolymer of polyvinyl alcohol (modification degree 17%) | 0.17 |
| Liquid paraffin | 0.03 |
| (ExY$_1$) Yellow dye-forming coupler | |

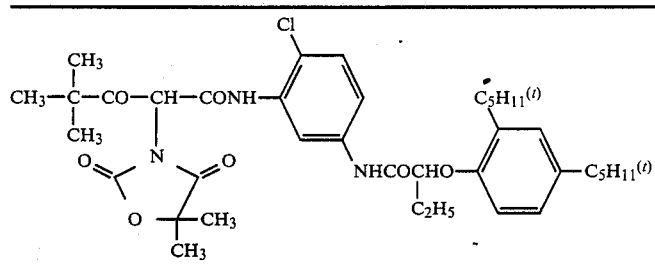
(ExM₁) Magenta dye-forming coupler
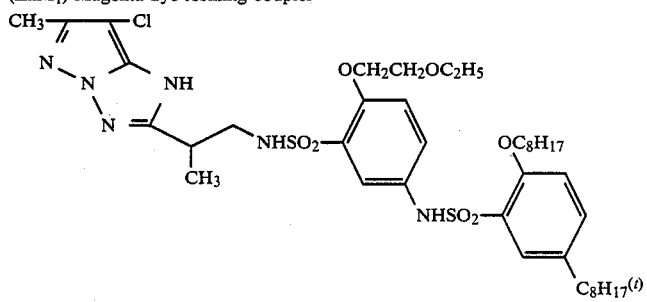
(ExC₁) Cyan dye-forming coupler
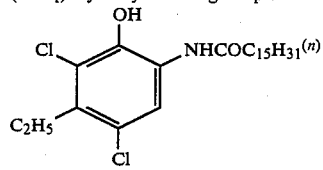
(Cpd-1) Dye image stabilizer
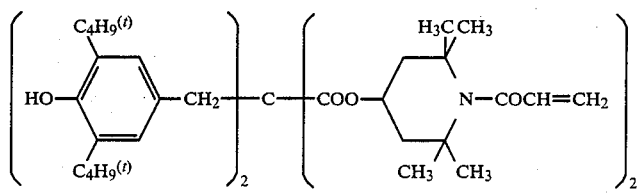
(Cpd-2) Color mixing inhibitor
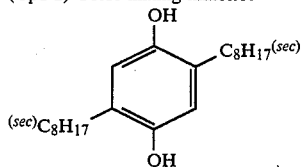
(Cpd-3) Dye image stabilizer
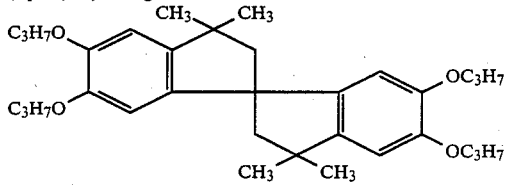
(Cpd-4) Dye image stabilizer
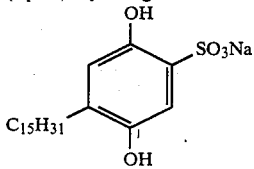
(Cpd-5) Color mixing inhibitor

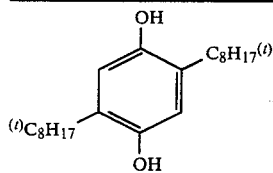
(Cpd-6) Dye image stabilizer
2:5:5 (weight ratio) Mixture of
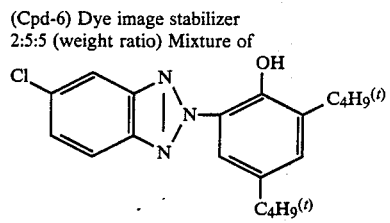
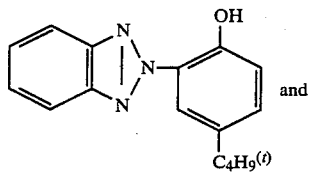 and
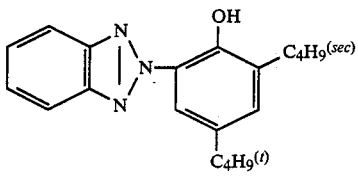
(Cpd-7) Polymer
$(CH_2-CH)_{\overline{n}}$
           $|$
           $CONHC_4H_9^{(t)}$
Average molecular weight 80,000
(UV-1) Ultraviolet absorber
1:4:3 (weight ratio) Mixture of
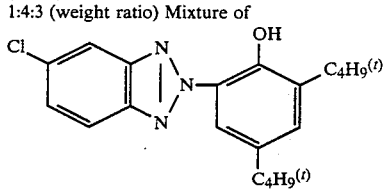
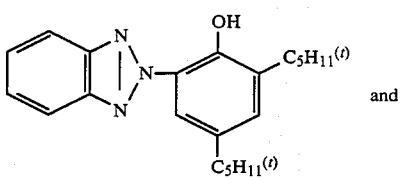 and
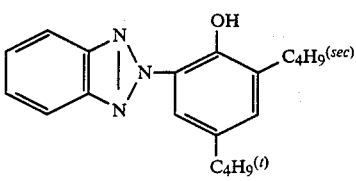
(Solv-1) Solvent
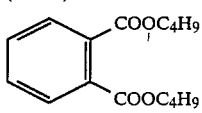
(Solv-2) Solvent
2:1 (volume ratio) Mixture of -continued

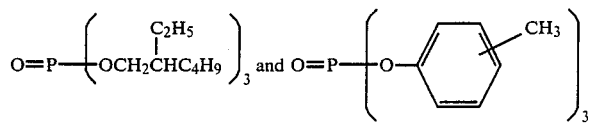

(Solv-3) Solvent

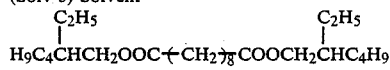

(Solv-4) Solvent

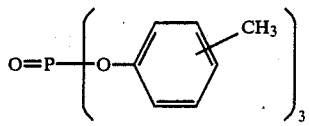

Samples (1) to (8) were prepared where dyestuffs of the invention and a comparative dyestuff were added to the above 4th layer, respectively. Dyestuffs which were added to respective samples are shown in Table 1. Added amount is $2\times10^{-5}$ mol/m² in each dyestuff.

TABLE 1

| | Sample | Dyestuff |
|---|---|---|
| (1) | Present invention | Compound-7 |
| (2) | Present invention | Compound-17 |
| (3) | Present invention | Compound-8 |
| (4) | Present invention | Compound-12 |
| (5) | Present invention | Compound-20 |
| (6) | Present invention | Compound-2 |
| (7) | Present invention | Compound-2.Compound-17 |
| (8) | Comparison | (structure shown) |

(Dyestuff disclosed in J.P. KOKOKU No. 54-35544)

Samples (1) to (8) were measured for stability of the dyestuff in the membrane and exposure humidity dependency were measured. The stability was evaluated as survival rate of the dyestuff after the green samples were each left as they are at 35° C.-80% for 2 weeks. On the other hand, the exposure humidity dependency was evaluated as relative sensitivity at the optical density of 1.0 on the blue-sensitive layer (where variation of relative sensitivity is relatively large) after the samples were exposed to light under the condition of 25° C.-55% and 25° C. -85% respectively and then subjected to the following process. Results of the evaluations are shown in Table 2.

| Process steps | Temperature | Time |
|---|---|---|
| Color development | 33° C. | 3 minutes and 30 seconds |
| Bleach-fixing | 33° C. | 1 minute and 30 seconds |
| Water washing | 24–34° C. | 3 minutes |

| Process steps | Temperature | Time |
|---|---|---|
| Drying | 70–80° C. | 1 minute |

Compositions of respective processing solutions are as follows.

| Color developing solution | |
|---|---|
| Water | 800 ml |
| Diethylenetriaminepentaacetic acid | 1.0 g |
| Nitrilotriacetic acid | 1.5 g |
| Benzyl alcohol | 15 ml |
| Diethylene glycol | 10 ml |
| Sodium sulfite | 2.0 g |
| Potassium bromide | 0.5 g |
| Potassium carbonate | 30 g |
| N-Ethyl-N-(β-methanesulfonamidoethyl)-3-methyl-4-aminoaniline sulfate | 5.0 g |
| Hydroxylamine sulfate | 4.0 g |
| Fluorescent whitener (WHITEX4B, manufactured by SUMITOMO CHEMICAL CO., LTD.) | 1.0 g |
| Water | to 1000 ml |
| pH (25° C.) | 10.20 |

-continued

| Bleach-fixing solution | |
|---|---|
| Water | 400 ml |
| Ammonium thiosulfate | 150 ml |
| Sodium sulfite | 18 g |
| Ammonium (Ethylenediaminetetraacetato) iron (III) | 55 g |
| Disodium ethylenediaminetetraacetate | 5 g |
| Water | to 1000 ml |
| pH (25° C.) | 6.70 |

TABLE 2

| Sample | Survival rate of dyestuff | Relative sensitivity (25° C.-55%) | Difference in relative sensitivity (25° C.-85%)–(25° C.-55%) |
|---|---|---|---|
| (1) | 97% | 107 | −14 |
| (2) | 96% | 110 | −12 |
| (3) | 95% | 110 | −15 |
| (4) | 94% | 105 | −14 |
| (5) | 93% | 107 | −14 |
| (6) | 99% | 105 | −16 |
| (7) | | 110 | −15 |
| (8) | 78% | 100 | −31 |

As is apparant from Table 2, samples (1) to (7) where dyestuffs of the invention were used are excellent in stability in respective membranes, have a high relative sensitivity at 25° C. -55%, and have only a small sensitivity lowering at 25° C. -85%.

EXAMPLE 2

Exposure humidity dependency of samples (1) to (8) of Example 1 was evaluated after they were treated in the same manner as in Example 1 except that the following process steps were employed in place of those in Example 1. Results of the evaluation were shown in Table 3.

| Process steps | Temperature | Time |
|---|---|---|
| Color development | 38° C. | 1 minute and 40 seconds |
| Bleach-fixing | 30–34° C. | 1 minute and 0 second |
| Rinse ① | 30–34° C. | 20 seconds |
| Rinse ② | 30–34° C. | 20 seconds |
| Rinse ③ | 30–34° C. | 20 seconds |
| Drying | 70–80° C. | 50 seconds |

(Rinse was carried out by 3 tanks counterflow method from rinse ③ to rinse ①)

Compositions of respective processing solutions are follows.

| Color developing solution | |
|---|---|
| Water | 800 ml |
| Diethylenetriaminepentaacetic acid | 1.0 g |
| 1-Hydroxyethylidene-1,1-diphosphonic acid (60%) | 2.0 g |
| Nitrilotriacetic acid | 2.0 g |
| Triethylenediamine(1,4-diazabicyclo[2,2,2]octane | 5.0 g |
| Potassium bromide | 0.5 g |
| Potassium carbonate | 30 g |
| N-Ethyl-N-(β-methanesulfonamidoethyl)-3-methyl-4-aminoaniline sulfate | 5.5 g |
| Diethylhydroxylamine | 4.0 g |
| Fluorescent whitener (UVITEX-CK manufactured by Ciba-Geigy Ltd.) | 1.5 g |
| Water | to 1000 ml |
| pH (25° C.) | 10.25 |

| Bleach-fixing solution | |
|---|---|
| Water | 400 ml |
| Ammonium thiosulfate (70%) | 200 ml |
| Sodium sulfite | 20 g |
| Ammonium (ethylenediaminetetraacetato) iron (III) | 60 g |
| Disodium ethylenediaminetetraacetate | 10 g |
| Water | to 100 ml |
| pH (25° C.) | 7.00 |

TABLE 3

| Sample | Difference in relative sensitivity (25° C.-85%)–(25° C.-55%) |
|---|---|
| (1) | −16 |
| (2) | −14 |
| (3) | −15 |
| (4) | −17 |
| (5) | −14 |
| (6) | −16 |
| (7) | −17 |
| (8) | −40 |

As is apparent from Table 3, samples (1) to (7) where dyestuffs of the invention are employed have only a low sensitivity lowering at 25° C. -85%.

EXAMPLE 3

Multi-layered photographic papers were prepared which each comprises a paper support, both surface of which are liminated with polyethylene, having provided thereon layers having the following compositions respectively. Coating solutions were prepared as follows respectively. Preparation of coating solution for the 1st layer.

Ethyl acetate (27.2 cc) and 7.7 cc of a solvent (Solv-1) were added to 19.1 g of a yellow dye-forming coupler (ExY$_2$) and 4.4 g of a dye image stabilizer (Cpd-1) to make a solution. The solution was then emulsified and dispersed in 185 cc of an aqueous 10% gelatin solution containing 8 cc of 10% sodium dodecylbenzenesulfonate. Separately, an emulsion was prepared by adding the following blue-sensitive sensitizing dye to a monodispersed cubic silver chlorobromide emulsion (containing 1.0 mol % silver bromide and 70 g/kg Ag) having an average grain size of 0.96 μm and a variation coefficient of 9.2% in an amount of $5.0 \times 10^{-4}$ mol per 1 mol of silver. The aforesaid emulsified dispersion and this emulsion were mixed to make a solution, whereby there was prepared a coating solution for the 1st layer having the following composition.

Coating solutions for the 2nd to the 7th layers were prepared in manners similar to that in the coating solution for the 1st layer.

1-Oxy-3,5-dichloro-s-triazine sodium salt was used as a gelatin-hardening agent for each layer.

The following dyes were used as spectrally sensitizing dyes for respective layers.

Blue-sensitive emulsion layer

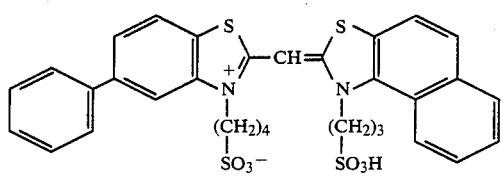

($5 \times 10^{-4}$ mol per 1 mol of silver halide)

Green-sensitive emulsion layer

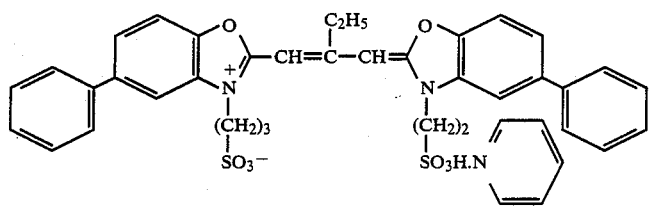

($4.0 \times 10^{-4}$ mol per 1 mol of silver halide)

and

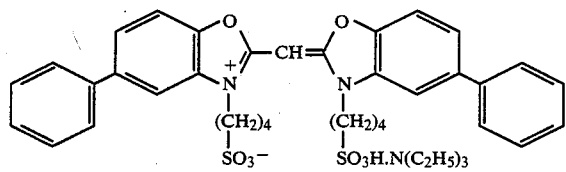

($7.0 \times 10^{-5}$ mol per 1 mol of silver halide)

Red-sensitive emulsion layer

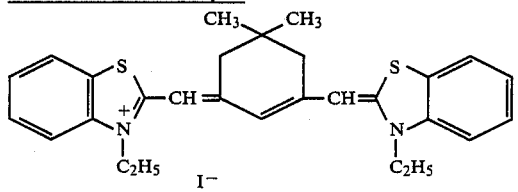

($9.0 \times 10^{-5}$ mol per 1 mol of silver halide)

The following compound was added to the red-sensitive layer in an amount of $2.6 \times 10^{-3}$ mol per 1 mol of silver halide.

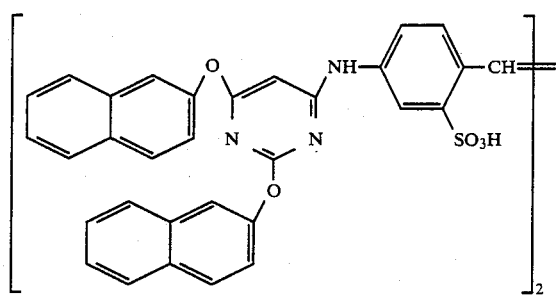

Further, 1-(5-methylureidophenyl)-5-mercaptotetrazole was added to the blue-sensitive emulsion layer, the green-sensitive emulsion layer and the red-sensitive emulsion layer respectively in an amount of $8.5 \times 10^{-5}$ mol, $7.7 \times 10^{-4}$ mol and $2.5 \times 10^{-4}$ mol.

Compositions of the respective layers are exhibited below. Figures represent coating amount (g/m$^2$). Figures in respect of silver halide represent coating amount in terms of silver amount.

| | |
|---|---|
| Support | |
| Paper lamination with polyethylene (containing a white pigment (TiO$_2$) and a bluish dyestuff (ultramarine) in polyethylene on the 1st layer side) | |
| The 1st layer (Blue-sensitive layer) | |
| Monodispersed cubic silver chlorobromide emulsion (Br 1 mol %) having an average grain size of 0.96 μm and a variation coefficient of 9.2% | 0.30 |
| Gelatin | 1.86 |

-continued

| | |
|---|---|
| Support Paper lamination with polyethylene (containing a white pigment (TiO2) and a bluish dyestuff (ultramarine) in polyethylene on the 1st layer side) | |
| Yellow dye-forming coupler (ExY2) | 0.82 |
| Dye image stabilizer (Cpd-1) | 0.19 |
| Solvent (Solv-1) | 0.35 |
| The 2nd layer (Color mixing-inhibiting layer) | |
| Gelatin | 0.99 |
| Color mixing inhibitor (Cpd-2) | 0.08 |
| The 3rd layer (Green-sensitive layer) | |
| Monodispersed cubic silver chlorobromide emulsion (Br 1 mol %) having an average grain size of 0.54 μm and a variation coefficient of 10.0% | 0.36 |
| Gelatin | 1.24 |
| Magenta dye-forming coupler (ExM2) | 0.31 |
| Dye image stabilizer (Cpd-3) | 0.25 |
| Dye image stabilizer (Cpd-8) | 0.12 |
| Solvent (Solv-2) | 0.42 |
| The 4th layer (Ultraviolet-absorbing layer) | |
| Gelatin | 1.58 |
| Ultraviolet absorber (UV-1) | 0.62 |
| Color mixing inhibitor (Cpd-5) | 0.05 |
| Solvent (Solv-3) | 0.24 |
| The 5th layer (Red-sensitive layer) | |
| Monodispersed cubic silver chlorobromide emulsion (Br 1 mol %) having an average grain size of 0.55 μm and a variation coefficient of 10.3% | 0.23 |
| Gelatin | 1.34 |
| Cyan dye-forming coupler (ExC2) | 0.34 |
| Dye image stabilizer (Cpd-6) | 0.17 |
| Polymer (Cpd-7) | 0.40 |
| Solvent (Solv-4) | 0.23 |
| The 6th layer (Ultraviolet-absorbing layer) | |
| Gelatin | 0.53 |
| Ultraviolet absorber (UV-1) | 0.21 |
| Solvent (Solv-3) | 0.08 |
| The 7th layer (Protective layer) | |
| Gelatin | 1.33 |
| Acryl-modified copolymer of polyvinyl alchohol (modification degree 17%) | 0.17 |
| Liquid paraffin | 0.03 |

(ExY2) Yellow dye-forming coupler

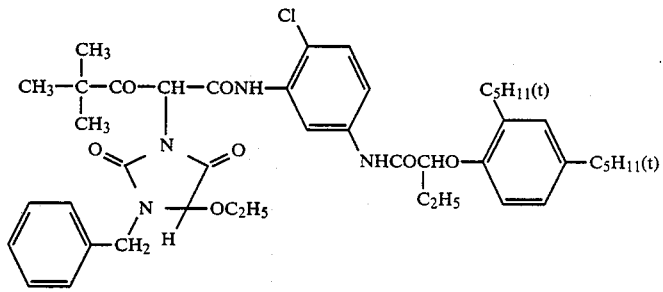

(ExM2) Magenta dye-forming coupler

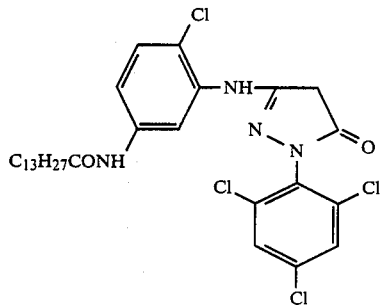

(ExC2) Cyan dye-forming coupler

-continued

Support
Paper lamination with polyethylene (containing a white
pigment (TiO$_2$) and a bluish dyestuff (ultramarine) in
polyethylene on the 1st layer side)

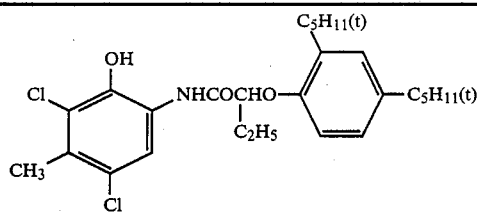

(Cpd-8) Dye image stabilizer

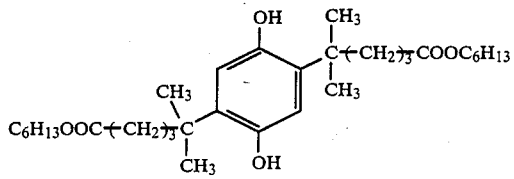

Samples (9) to (16) were prepared by adding dyestuffs of the invention and a comparative dyestuff to the aforementioned 4th layer. Dyestuffs which were added to respective samples were exhibited in Table 4. Added amount of each dyestuff wae $2\times10^{-5}$ mol/m$^2$.

TABLE 4

| | Sample | Dyestuff |
|---|---|---|
| (9) | Present invention | Compound-5 |
| (10) | Present invention | Compound-1 |
| (11) | Present invention | Compound-2 |
| (12) | Present invention | Compound-7 |
| (13) | Present invention | Compound-16 |
| (14) | Present invention | Compound-5, Compound-16 |
| (15) | Present invention | Compound--2, Compound-19 |
| (16) | Comparison | |

Samples (9) to (16) were investigated for exposure humidity dependency was evaluated as relative sensitivity at an optical density of 1.0 on the blue-sensitive layer (where variation of relative sensitivity is relatively large) after the samples were exposed to light under the condition of 25° C. -55% and 25° C. -85% respectively and then subjected to the following process. Results of the evaluations are shown in Table 5.

| Process steps | Temperature | Time |
|---|---|---|
| Color development | 35° C. | 45 seconds |
| Bleach-fixing | 30–36° C. | 45 seconds |
| Stabilization ① | 30–37° C. | 20 seconds |

-continued

| Process steps | Temperature | Time |
|---|---|---|
| Stabilization ② | 30–37° C. | 20 seconds |
| Stabilization ③ | 30–37° C. | 20 seconds |
| Stabilization ④ | 30–37° C. | 30 seconds |
| Drying | 70–85° C. | 60 seconds |

(Stabilization step was carried out by 4 tank counterflow method from stabilization ④ to ①).

Compositions of respective processing solutions are as follows.

| Color developing solution | |
|---|---|
| Water | 800 ml |
| Ethylenediaminetetraacetic acid | 2.0 g |
| Triethanolamine | 8.0 g |
| Sodium chloride | 1.4 g |
| Potassium carbonate | 25 g |

-continued

| | |
|---|---|
| N-Ethyl-N-(β-methanesulfonamidoethyl)-3-methyl-4-aminoaniline sulfate | 5.0 g |
| N,N-Diethylhydroxylamine | 4.2 g |
| 5,6-Dihydroxybenzene-1,2,4-trisulfonic acid | 0.3 g |
| Fluorescent whitener (4,4'-Diaminostilbene series) | 2.0 g |
| Water | to 1000 ml |
| pH (25° C.) | 10.10 |

Bleach-fixing solution

| | |
|---|---|
| Water | 400 ml |
| Ammonium thiosulfate (70%) | 100 ml |
| Sodium sulfite | 18 g |
| Ammonium (ethylenediaminetetraacetato) iron (III) | 55 g |
| Disodium ethylenediaminetetraacetate | 3 g |
| Glacial acetic acid | 8 g |
| Water | to 1000 ml |
| pH (25° C.) | 5.5 |

Stabilizing solution

| | |
|---|---|
| Formalin (37%) | 0.1 g |
| Formalin-sulfurous acid adduct | 0.7 g |
| 5-chlore-2-methyl-4-isothiazolin-3-one | 0.2 g |
| 2-Methyl-4-isothiazolin-3-one | 0.01 g |
| Cupric sulfate | 0.005 g |
| water | to 1000 ml |
| pH (25° C.) | 4.0 |

TABLE 5

| Sample | Difference in relative sensitivity (25° C.-85%)–(25° C.-55%) |
|---|---|
| (9) | −15 |
| (10) | −14 |
| (11) | −17 |
| (12) | −15 |
| (13) | −15 |
| (14) | −17 |
| (15) | −14 |
| (16) | −42 |

As apparent from Table 5, in samples (9) to (15) wherein dyestuffs of the invention were used there was only a small lowering of sensitivity in high humidity exposure to light, and thus the dyestuffs are excellent ones.

EXAMPLE 4

Gelatin (50 g) was dissolved in water, and 3.1 g of deystuffs as listed in Table 6 were added therein, respectively. Further, 30 ml of 4 weight % aqueous solution of sodium dodecylbenzenesulfonate as a surfactant and 45 ml of 1 weight % aqueous solution of 1-hydroxy-3,5-dichlorotriazine sodium salt were added thereto, and then total volume thereof was adjusted to 1 l with water. The resulting gelatin-containing aqueous solution was applied onto a cellulose triacetate film to the dry membrane thickness of 5 μm. Separately, 60 ml of a 0.05 weigth % methanol solution of sensitizing dye II-1 as exhibited below and disclosed in J.P. KOKAI No. 59-192242 and 40 ml of a 1.0 weitht % methanol solution of compound III-1 as exhibited below and disclosed in J.P. KOKAI No. 59-192,242 were added to 1 kg of a silver chloroiodobromide (bromine content 70 mol %, iodine content 0.2 mol %, average diameter of silver halide 0.45 μ) emulsion as chemically sensitized with gold and sulfur compounds; 30 ml of an aqueous 4.0 weight % sodium dodecylbenzenesulfonate solution was added thereto; and 35 ml of an aqueous 1.0 weight % 1-hydroxy-3,5-dichlorotriazine sodium salt solution was then added thereto, followed by stirring. The mixture was applied onto a surface opposite from the gelatin-coated surface on the aforesaid film. An aqueous solution containing gelatin and sodium dodecylbenzenesulfonate was further applied thereon as a protective layer.

The thus prepared films were each exposed with (A) light emitting diode and (B) semiconductor laser of 783 nm, and processed with automatic developing machine FG-800RA (manufactured by FUJI PHOTO FILM CO, LTD.) at 38° C. for 20 seconds using developing solution LD-835 (manufactured by FUJI PHOTO FILM CO., LTD.)

Evaluation of image quality was done by 5 grade from 1 (there is much fringe and image quality is very bad) to 5 (there is no fringe and image is sharp). Evaluation of remaining color was done by 5 grades from 1 (there is much remaining color) to 5 (there is no remaining color).

Results are shown in Table 6.

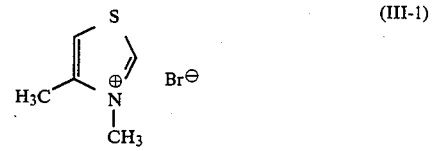

(III-1)

TABLE 6

| Sample No. | Dyestuff No. | Image quality A | Image quality B | Remaining color after processing |
|---|---|---|---|---|
| 17 (comparison) | no dyestuff | 1 | 1 | 5 |
| 18 (present invention) | 31 | 4 | 5 | 5 |
| 19 (present invention) | 33 | 4 | 5 | 5 |
| 20 (present invention) | 34 | 4 | 5 | 5 |
| 21 (present invention) | 35 | 4 | 5 | 5 |
| 22 (present invention) | 39 | 4 | 5 | 4 |
| 23 (comparison) | comparative dyestuff a | 3 | 4 | 3 |
| 24 (comparison) | comparative dyestuff b | 3 | 4 | 3 |

Comparative dyestuff a is the following dyestuff disclosed in J.P. KOKOKU No. 58-35544.

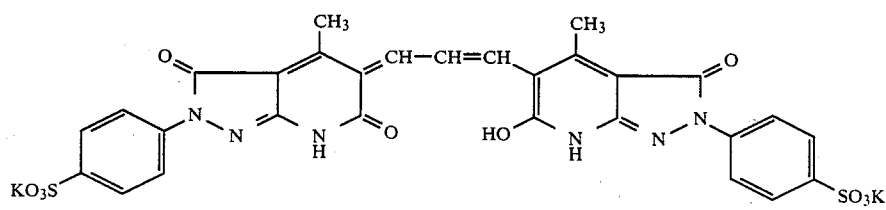

Comparative dyestuff b is the following dyestuff disclosed in U.S. Pat. No. 2,895,955.

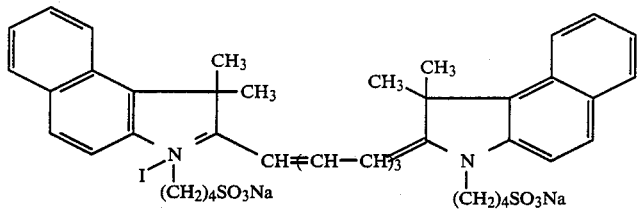

As apparent from Table 6, in systems wherein dyestuffs of the invention were used an image having good image quality and only a small remaining color can be obtained by exposure with either of light emitting diode and semiconductor laser.

EXAMPLE 5

Gelation (50 g) was dissolved in 800 g of water, dyestuffs were added thereto to amounts exhibited in Table 7 respectively, mordant A as exhibited below was added thereto, and the mixtures were applied onto cellulose triacetate films respectively. The same infrared-sensitized silver halide emulsion layers as in Example 4 were provided on the films respectively, and then an aqueous solution containing gelatin and sodium dodecylbenzenesulfonate was applied thereon respectively.

Each of the resulting samples was subjected to optical wedge exposure to light through a dark red filter (SC-72 manufactured by FUJI PHOTO FILM CO., LTD.), developed with the following developing solution at 20° C. for 4 minutes, stopped, fixed, and then water washed. The resulting sample was measured for density using a P type densitometer (manufactured by FUJI PHOTO FIIM CO., LTD.) to obtain sensitivity and fog valves (Sensitivity is represented by a reciprocal of radiation intensity giving an optical density of fog+0.3). Evaluation of image quality was carried out in the same manner as in Example 4.

| Prescription of the developing solution | |
|---|---|
| Metol | 0.31 g |
| Anhydrous sodium sulfite | 39.6 g |
| Hydroquinone | 6.0 g |
| Anhydrous sodium carbonate | 18.7 g |
| Potassium bromide | 0.86 g |
| Citric acid | 0.68 g |
| Potassium metabisulfite | 1.5 g |
| Water | to 1 l |

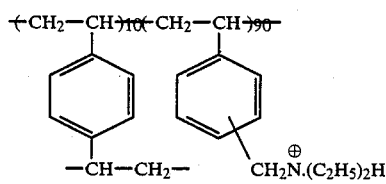 Mordant A

| No. | Dyestuff | Added amount | Relative sensitivity | Fog | Image quality |
|---|---|---|---|---|---|
| 25 (comparison) | — | — | 100 (Standard) | 0.04 | 1 |
| 26 (present invention) | 31 | 0.02 g/m² | 93 | 0.04 | 3 |
| 27 (present invention) | 31 | 0.04 g/m² | 79 | 0.04 | 4 |
| 28 (present invention) | 33 | 0.02 g/m² | 87 | 0.04 | 3 |
| 29 (present invention) | 33 | 0.04 g/m² | 71 | 0.04 | 4 |
| 30 (present invention) | 39 | 0.02 g/m² | 74 | 0.04 | 3 |
| 31 (present invention) | 39 | 0.04 g/m² | 63 | 0.04 | 4 |
| 32 (comparison) | Dyestuff a | 0.02 g/m² | 33 | 0.08 | 2 |
| 33 (comparison) | Dyestuff b | 0.02 g/m² | 42 | 0.10 | 2 |

Dyestuffs a and b are the same with dyestuffs a and b respectively disclosed in Example 4.

It is apparent from Table 7 that though the dyestuffs of the invention cause a slight lowering of sensitivity, the degree of lowering is much less than that in the dyestuffs for comparison, and in case of use of the dyestuffs of the invention fog is not raised and image quality is good (Sample Nos. 26 to 31).

EXAMPLE 6

Samples as obtained in Example 5 were exposed with semiconductor laser of 783 nm, and developed with a processing solution for printing (GS-1 processing solution manufactured by FUJI PHOTO FILM CO., LTD.). Processing conditon: 38° C., 30 seconds.

Image quality of the resulting images was evaluated in the same manner as in Example 4, and the results are shown in Table 8.

TABLE 8

| No. | Fog | Image quality |
|---|---|---|
| 34 (comparison) | 0.04 | 1 |
| 35 (present invention) | 0.04 | 4 |
| 36 (present invention) | 0.04 | 5 |
| 37 (present invention) | 0.04 | 4 |
| 38 (present invention) | 0.04 | 5 |
| 39 (present invention) | 0.04 | 4 |
| 40 (present invention) | 0.04 | 5 |
| 41 (comparison) | 0.10 | 2 |
| 42 (comparison) | 0.09 | 2 |

As is apparent from Table 8, light-sensitive materials having good image quality and having only a few fog can be obtained in the system of the invention (Sample Nos. 35 to 40).

EXAMPLE 7

A methanol solution of 0.05 wt % sensitizing dye II-1 as exhibited below (70 ml) and 40 ml of a methanol solution of 1.0 wt % Compound III-1 as exhibited below were added to 1 kg of a silver chlorobromide (bromine content 80 mol %, average diameter of silver halide 0.32 μ) emulsion which had been subjected to gold and sulfur sensitizations. Dyestuffs as exhibited in Table 9 were added thereto respectively, and 35 ml of a 4.0 wt % sodium dodecylbenzensulfonate solution was added. The mixtures were stirred and applied onto cellulose triacetate film. Further, a solution containing gelatin and sodium dodecylbenzensulfonate was applied onto respective coated layers as a protective layer.

The thus obtained films were exposed with semiconductor laser of 783 nm and developed with Super HSL System manufactured by FUJI PHOTO FILM CO., LTD., respectively.

Evaluation of image was carried out by 5 grades from 1 (there is much fringe and image quality is very bad) to 5 (there is no fringe and image is sharp). Evaluation of remaining color was carried out by 5 grades from 1 (there is very much remaining color) to 5 (there is no remaining color). Results are shown below.

| Sensitizing dye II-1 | the same with sensitizing dye II-1 of Example 4 |
| Compound III-1 | the same with Compound III-1 of Example 4 |

TABLE 9

| Sample | Dyestuff | Image quality | Remaining color | Relative sensitivity | Fog |
|---|---|---|---|---|---|
| 43 (comparison) | No dyestuff | 1 | 5 | 100 | 0.04 |
| 44 (present invention) | 31 (70 mg) | 4 | 5 | 74 | 0.04 |
| 45 (present invention) | 34 (70 mg) | 4 | 5 | 81 | 0.04 |
| 46 (present invention) | 39 (70 mg) | 4 | 5 | 79 | 0.04 |
| 47 (comparison) | comparative dyestuff a (70 mg) | 3 | 3 | 42 | 0.06 |
| 48 (comparison) | comparative dyestuff b (70 mg) | 3 | 3 | 59 | 0.07 |

Comparative dyestuffs a and b are the same with comparative dyestuffs a and b of Example 4.

It is apparent from the results of Table 9 that by use of dyestuffs of the invention good image quality and only a little remaining color as well as only a small lowering of sensitivity and only a low fog can be obtained.

From the foregoing it will be appreciated that silver halide photographic light-sensitive materials containing dyestuffs represented by the general formula (I) of the invention have remarkable effects, for example, that stability of dyestuffs in the membrane with time lapse is high, relative sensitivity is high, lowering of sensitivity in exposure to light under high humidity is small, image quality is excellent, there is only a little remaining color, and there is only a little fog.

What is claimed is:

1. A silver halide photographic light-sensitive element comprising a support, at least one silver halide emulsion layer and at least one dyestuff represented by the general formula (I), wherein the content of the dyestuff is from 0.05 to 3.0 in terms of optical density:

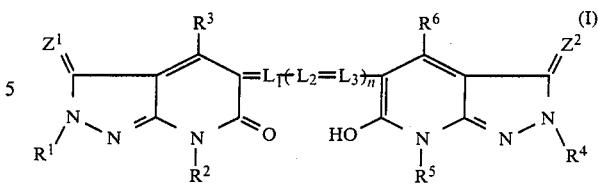

wherein $R^1$ and $R^4$ each represent a substituted or unsubstituted alkyl group, a substituted or unsubstituted aryl group or a substituted or unsubstituted heterocyclic group; $R^2$ and $R^5$ each represent a substituted or unsubstituted aryl group, a substituted or unsubstituted heterocyclic group, $-COR^7$ or $-SO_2R^7$; $R^3$ and $R^6$ each represent a hydrogen atom, a cyano group, a hydroxyl group, a carboxylic acid group, a substituted or unsubstituted alkyl group, a substituted or unsubstituted aryl group, $-COOR^7$, $-OR^7$, $-NR^8R^9$, $-N(R^8)COR^9$, $-N(R^8)SO_2R^9$, $-CONR^8R^9$ or $-N(R^8)CONR^8R^9$ (wherein $R^7$ represents a substituted or unsubstituted alkyl group or a substituted or unsubstituted aryl group, and $R^8$ and $R^9$ each represent a hydrogen atom, a substituted or unsubstituted alkyl group or a substituted or unsubstituted aryl group); $Z^1$ represents an oxygen atom or $=NR^{10}$; $Z^2$ represents an oxygen atom or $=NR^{11}$ (wherein $R^{10}$ and $R^{11}$ represent non-metal atomic groups necessary for forming a five-membered ring, which may have substituent(s) with linkage to $R^1$ and $R^4$ respectively); $L_1$, $L_2$ and $L_3$ each represent a substituted or unsubstituted methine group, or $L_1$, $L_2$ and $L_3$ as a whole represent a substituted or unsubstituted cyclic group where methine groups are linked together; and n represents 0, 1 or 2; provided that at least one of $R^1$, $R^2$, $R^3$, $R^4$, $R^5$, $R^6$, $L_1$, $L_2$ and $L_3$ represents a group having at least one carboxylic acid group or at least one sulfonic acid group.

2. The silver halide photographic light-sensitive element of claim 1 wherein the alkyl group in the definition of $R^1$ to $R^9$ is a straight-chain, branched or cyclic alkyl group having 1 to 6 carbon atoms, and when the alkyl group has substituent(s), the substituent(s) is(are) halogen atom(s), hydroxyl group(s), cyano group(s), carboxylic acid group(s), sulfonic acid group(s), alkoxy group(s), substituted or aryloxy group(s), substituted or amino group(s) or aryl group(s).

3. The silver halide photographic light-sensitive element of claim 1 wherein the aryl group in the definition of $R^1$ to $R^9$ is a phenyl group or a naphthyl group, and when the aryl group has substituent(s), the substituent(s) is(are) halogen atom(s), alkyl group(s), hydroxyl group(s), carboxylic acid group(s), sulfonic acid groups(s), cyano group(s), substituted or alkoxy group(s), substituted or unsubstituted amino group(s), substituted or unsubstituted carbamoyl group(s) or substituted or unsubstituted sulfamoyl group(s).

4. The silver halide photographic light-sensitive element of claim 1 wherein the heterocyclic group in the definition of $R_1$, $R^2$, $R^4$ and $R^5$ is a 5- or 6-membered nitrogen -containing heterocyclic group (containing a condensed ring), and when the heterocyclic group has substituted(s), the substituent(s) is(are) carboxylic acid group(s), sulfonic acid group(s), hydroxyl group(s), halogen atom(s), or substituted or unsubstituted alkyl group(s).

5. The silver halide photographic light-sensitive element of claim 4 wherein the nitrogen-containing heterocyclic ring (containing a condensed ring) is pyridine, pyrimidine, or benzothiazole, benzoxazole.

6. The silver halide photographic light-sensitive element of claim 1 wherein the 5-membered ring formed by linkage of $R^{10}$ and $R^{11}$ with respective $R^1$ and $R^4$ is an imidazole ring, a benzimidazole ring or a triazole ring, and when the 5-membered ring has substituent(s), the substituent(s) is(are) carboxylic acid group(s), sulfonic acid group(s), hydroxyl group(s), halogen atom(s), alkyl group(s), or substituted or unsubstituted alkoxy group(s).

7. The silver halide photographic light-sensitive element of claim 1 wherein the substituent of methine group in the definition of $L_1$, $L_2$ and $L_3$ is a substituted or unsubstituted alkyl group, an aryl group, a carboxylic acid group, a sulfonic acid group, a cyano group, a substituted or unsubstitued amino group, or a halogen atom.

8. The silver halide photographic light-sensitive element of claim 1 wherein the substituted or unsubstituted cyclic group where methine groups are linked together is

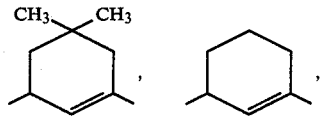

-continued

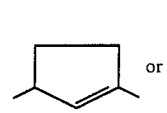 or 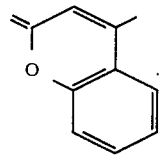

9. The silver halide photographic light-sensitive element of claim 1 wherein the carboxylic acid group or sulfonic acid group is in the form of a salt.

10. The silver halide photographic light sensitive element of claim 1 wherein $R^1$ and $R^4$ represent alkyl groups having at least one carboxylic or sulfonic acid group or aryl groups having at least one carboxylic or sulfonic acid group.

11. The silver halide photographic light-sensitive element of claim 1 wherein content of the dyestuff(s) represented by the general formula (I) (including the case where the dyestuff(s) is(are) in the form of salt(s)) is 0.05 to 3.0 in terms of optical density.

12. The silver halide photographic light-sensitive element of claim 1 wherein the dyestuff(s) represented by the general formula (I) (including the case where the dyestuff(s) is(are) in the form of salt(s) is(are) contained in an emulsion layer or another hydrophilic colloidal layer.

13. The silver halide photographic light-sensitive element of claim 1 which is a silver halide color photographic light-sensitive element.

* * * * *

UNITED STATES PATENT AND TRADEMARK OFFICE
CERTIFICATE OF CORRECTION

PATENT NO. : 4,920,031

DATED : April 24, 1990

INVENTOR(S) : Ohno et al

It is certified that error appears in the above-identified patent and that said Letters Patent is hereby corrected as shown below:

Claim 1, line 10, (column 54, line 13), after "represent" insert --a substituted or unsubstituted alkyl group,--.

Signed and Sealed this

Thirty-first Day of March, 1992

Attest:

HARRY F. MANBECK, JR.

Attesting Officer          Commissioner of Patents and Trademarks